(12) United States Patent
Li et al.

(10) Patent No.: US 12,014,309 B1
(45) Date of Patent: Jun. 18, 2024

(54) INTERFACE AND TOOL FOR CONFIGURING A CONTRACT WORKFLOW

(71) Applicant: Ironclad, Inc., San Francisco, CA (US)

(72) Inventors: Jason Li, San Francisco, CA (US); Cai Gogwilt, San Francisco, CA (US); Mary Zhuang, San Francisco, CA (US); Angela Kou, San Francisco, CA (US); Ben Newcomer, San Francisco, CA (US); Kevin Verdieck, San Francisco, CA (US)

(73) Assignee: Ironclad, Inc., San Francisco, CA (US)

( * ) Notice: Subject to any disclaimer, the term of this patent is extended or adjusted under 35 U.S.C. 154(b) by 609 days.

(21) Appl. No.: 17/003,706

(22) Filed: Aug. 26, 2020

Related U.S. Application Data

(60) Provisional application No. 62/892,330, filed on Aug. 27, 2019, provisional application No. 62/892,295, filed on Aug. 27, 2019.

(51) Int. Cl.
*G06Q 50/18* (2012.01)
*G06Q 10/067* (2023.01)
*G06Q 10/10* (2023.01)

(52) U.S. Cl.
CPC ......... *G06Q 10/067* (2013.01); *G06Q 10/103* (2013.01); *G06Q 50/18* (2013.01); *G06Q 50/188* (2013.01)

(58) Field of Classification Search
CPC .... G06Q 10/067; G06Q 10/103; G06Q 50/18; G06Q 50/188
See application file for complete search history.

(56) References Cited

U.S. PATENT DOCUMENTS 6,873,992 B1 * 3/2005 Thomas ................. G06Q 10/10
  707/E17.115
2004/0225571 A1 * 11/2004 Urali ..................... G06Q 10/10
  705/26.1

(Continued)

FOREIGN PATENT DOCUMENTS

| EP | 2909770 B1 | 2/2018 |
| WO | 2013163625 A1 | 10/2013 |
| WO | 2017173187 A1 | 10/2017 |

OTHER PUBLICATIONS

2009, Xiaochun, Fan. "Workflow Automation and Management in the Real Estate Office Automation System." 2009 Third International Symposium on Intelligent Information Technology Application Workshops. IEEE.

*Primary Examiner* — Carrie S Gilkey
(74) *Attorney, Agent, or Firm* — Banner & Witcoff, Ltd.

(57) ABSTRACT

A method includes updating, in a server, a workflow in a contract based on an action by a remote user. The method also includes storing an updated version of the contract in a directory, and providing, to an approver remotely coupled with the server, a link to the updated version. Updating the workflow includes at least one of: selecting a governing law or any other type of field or constraint controlling the updated version of the contract, —adding a conditional variable to the contract, the conditional variable configured to acquire a value based on an input from the remote user, or the approver, adding or removing a portion of the contract based on a value of the conditional variable in the contract, and modifying a role for the approver. A system and a non-transitory, computer-readable medium storing instructions to perform the above method are also disclosed.

24 Claims, 26 Drawing Sheets

(56) References Cited

U.S. PATENT DOCUMENTS

| | | | |
|---|---|---|---|
| 2008/0243662 A1* | 10/2008 | Subramaniam | G06Q 50/18 |
| | | | 705/38 |
| 2008/0306894 A1* | 12/2008 | Rajkumar | G06Q 10/0637 |
| | | | 706/47 |
| 2014/0164542 A1* | 6/2014 | McCabe | G06Q 10/10 |
| | | | 709/206 |
| 2015/0135300 A1 | 5/2015 | Ford | |
| 2015/0215491 A1 | 7/2015 | Faust | |
| 2015/0271148 A1 | 9/2015 | Ahari et al. | |
| 2018/0005186 A1 | 1/2018 | Hunn | |
| 2018/0060981 A1 | 3/2018 | Sher | |
| 2018/0268506 A1 | 9/2018 | Wodetzki et al. | |
| 2020/0082106 A1 | 3/2020 | Fox et al. | |
| 2022/0006846 A1 | 1/2022 | Kumbi et al. | |

\* cited by examiner

| TEST ▼ | DASHBOARD | RECORDS | BLUEPRINT | | | ◁ | ADMIN ▼ | JASON LI ▼ |

DASHBOARD

[⊕ START WORKFLOW] [MORE ▼]

(34) ASSIGNED TO ME  (33) ACTIVE  COMPLETED

[🔍 SEARCH FOR A WORKFLOW] [FILTERS ▼]

| TITLE | CREATED DATE | LAST UPDATED ▼ | ASSIGNED TO | STATUS | |
|---|---|---|---|---|---|
| NEW EMPLOYEE CONTRACT WITH JOHN DOE | JUNE 26TH, 2019 AT 1:17PM | JUNE 28TH, 2019 AT 1:28PM | JL | ●○○○ REVIEW | > |
| EIACA (DEMO) {5B842F6F48} WITH MICHAEL SMITH, INC. | APRIL 26TH, 2019 AT 5:05PM | APRIL 26TH, 2019 AT 5:07PM | JL | ●○○○ REVIEW | > |
| EIACA (DEMO) {5B842F6F48} WITH MICHAEL SMITH, INC. | APRIL 23RD, 2019 AT 9:41AM | APRIL 23TH, 2019 AT 9:42AM | R | ○○○○ CREATE | > |
| NEW EMPLOYEE CONTRACT WITH JAMES BROWN | MARCH 7TH, 2019 AT 1:11PM | MARCH 7TH, 2019 AT 1:12PM | JL | ●○○○ REVIEW | > |
| NEW EMPLOYED CONTRACT WITH JOE LEE | DECEMBER 21ST, 2018 AT 1:28PM | FEBRUARY 7TH, 2019 AT 3:05PM | JL | ●●○○ SIGN | > |
| NEW EMPLOYED CONTRACT WITH JOHN DOE | FEBRUARY 7TH, 2019 AT 3:04PM | FEBRUARY 7TH, 2019 AT 3:06PM | JD | ●●○○ SIGN | > |
| EIACA - DEMO WITH JAMES BROWN | DECEMBER 11TH, 2018 AT 9:49AM | DECEMBER 11TH, 2018 AT 9:54AM | JD | ●●○○ SIGN | > |
| INDIVIDUAL ONE-WAY NDA WITH DANIEL SMITH | DECEMBER 5TH, 2018 AT 10:15AM | DECEMBER 5TH, 2018 AT 10:15AM | - | ○○○○ CREATE | > |
| NDA WITH JACK DAVIS | DECEMBER 5TH, 2018 AT 10:14AM | DECEMBER 5TH, 2018 AT 10:14AM | - | ○○○○ CREATE | > |
| NDA WITH MARY WILLIAMS | DECEMBER 5TH, 2018 AT 9:49AM | DECEMBER 5TH, 2018 AT 9:49AM | - | ○○○○ | > |

(?) HELP

422 — ATTRIBUTES | ADD CONDITION
410 — CONTRACT PROPERTIES
412 — COUNTERPARTY
414 — COUNTERPARTY NAME
— CONTRACT
416 — AGREEMENT DATE
418 — GOVERNING LAW
424 — CUSTOM PROPERTIES
— INVENTION TITLE
— INVENTION DATE
— INVENTIONS
— SIGNER ROLE PROPERTIES
426 — COUNTERPARTY SIGNER
— COUNTERPARTY SIGNER EMAIL
— COUNTERPARTY SIGNER SIGNATURE
— COUNTERPARTY SIGNER DATE FIELD
— CONDITIONS
— IS NY
— NO INVENTIONS
428 — HAS INVENTION
— IS CA

EIACA (DEMO) (5B842F6F48)   ● LIVE  ✓ RECORDS SEARCHABLE   SAVE  PUBLISH

PEOPLE — 901

APPROVERS
LEGAL — 912
[X] JOEL LEE (USER) — 914   APPROVES WHEN  [ALWAYS] — 916-1
NY MANAGER
[X] JOEL LEE (USER)   APPROVES WHEN  [IS NY] — 916-2   910
⊕ ADD APPROVER
⊕ ADD SEQUENTIAL APPROVAL

SIGNERS
ORDER: 1
COUNTERPARTY SIGNER — 926
⊙ WHEN DO THEY SIGN? [ALWAYS]   920
⊕ ADD SIGNER

ARCHIVER — 930
VERIFIES THE FINAL CONTRACT INFORMATION FOR RECORDS STORAGE WHEN A DOCUMENT HAS BEEN MANUALLY UPLOADED DURING THE REVIEW OR SIGN STEPS, OR WHEN THERE ARE NO SIGNERS.

(?) HELP

1100A

NEW EMPLOYEE CONTRACT WITH JAMES BROWN — 1101
SUBMITTED BY JOE LEE ON JUL 12, 2019 11:30 AM

REVIEW AND CHANGE
PLEASE REVIEW THE DOCUMENT BELOW FOR APPROVAL.

NEW EMPLOYEE CONTRACT WITH JAMES BROWN 5D28D1D41C.DOCX — 1112
VERSION 1 - LAST MODIFIED A FEW SECONDS AGO
- ✎ QUICK EDIT
- ⊙ DOWNLOAD
- ⟲ REDLINES

IF CHANGES TO THE DOCUMENT ARE REQUIRED, CLICK UPDATE DOCUMENT TO UPLOAD A MODIFIED VERSION OF THE DOCUMENT. YOU CAN CLICK EDIT INFO TO CHANGE THE METADATA THAT WAS ALREADY ENTERED. THE DOCUMENT WILL BE AUTOMATICALLY UPDATED TO REFLECT THE CHANGES. — 1113

[ SHARE DOCUMENT ] [ UPDATE DOCUMENT ] [ EDIT INFO ]     [ APPROVE ▾ ]

0 OF 2 APPROVALS COLLECTED — 1114

| LEGAL | JOE LEE | PENDING | ⊙ ⋯ |
|---|---|---|---|
| NY MANAGER | JOE LEE | PENDING | ⊙ ⋯ |

ACTIVITY FEED — 1116

[ ADD A COMMENT                                    @ ] [ ADD COMMENT ]

PRESS CTRL- OR ✕-ENTER TO SUBMIT.

---

1120

PARTICIPANTS
[JL]

EMPLOYEE'S NAME — 1122
JAMES BROWN

NEW EMPLOYEE'S EMAIL ADDRESS
✉ JOELEE+TEST@STEELAPP.COM

AGREEMENT DATE — 1124
JULY 12, 2019

GOVERNING LAW
NEW YORK

DO YOU HAVE ANY INVENTIONS?
YES

INVENTION TITLE
SUPER COOL THING

INVENTION DATE
JULY 11, 2019

DRAFT — 1126
📄 NEW EMPLOYEE CONTRACT WITH JAMES BROWN 5D28D1D41C.DOCX

WORKFLOW CHECKLIST — 1128
- ⊘ CREATE
- ○ REVIEW
- ○ SIGN
- ○ ARCHIVE

YOU CAN SEND EMAILS DIRECTLY TO THIS

MARKETING CASE STUDY ○ NOT PUBLISHED | ○4 △1 ↶ ↷ | SAVE PUBLISH

▣ DOCUMENT > ⋮≡ FORM BUILDER > ✓ REVIEW > ✱ SIGN > ⊞ ARCHIVE

< EDIT CONDITION

IS VIDEO TESTIMONIAL

RULES   USAGES

IF  CASE STUDY MATERIALS  ⌄
↳ INCLUDES  VIDEO TESTIMONIAL  ⌄

⊕ ADD RULE ▾

REVIEW

APPROVAL ROLES   SETTINGS

APPROVER ROLES

ORDER 1 ▾ ——— 1120D

LEGAL

[ × RAI RODWILT (USER) ]  × ▸   APPROVES   ALWAYS   ☐

VIDEO TEAM ——— 1175

SELECT...   ▴   APPROVES   ALWAYS   ☐

ADMINISTRATORS
EVERYONE
USERS
RAI+TEST@STEELAPP.COM
RAI+TESTINWIFE@STEELAPP.COM
~~RAI RODWILT~~

⊕ AD

1180

? HELP

CANCEL                                    DELETE  SAVE

MARKETING CASE STUDY ○ NOT PUBLISHED　　　　　　　⊙4 △1 ↶ ↷　SAVE | PUBLISH

← | ATTRIBUTES　ADD CONDITION | ▣ DOCUMENT > ⋮≡ FORM BUILDER > ✓ REVIEW > ✦ SIGN > ▣ ARCHIVE | ⑦ HELP

1201

SIGN

CONTRACT PROPERTIES ˅

CONTRACT
▭ COUNTERPARTY NAME
⊚ COUNTERPARTY ADDRESS  422
▭ CASE STUDY MATERIALS

SIGNER ROLES　　SETTINGS
　　　　　　　　　  ⤶ 1225

SIGNATURE PROCESS

SIGNATURE PACKET REQUEST TRIGGER
⦿ REQUIRE THE SIGNATURE COORDINATOR'S APPROVAL TO SEND OUT FOR ESIGNATURE
○ AUTOMATICALLY SEND OUT ONCE ALL APPROVALS HAVE BEEN COLLECTED

SIGNER ROLE PROPERTIES ˅

⊙ COUNTERPARTY SIGNER　△
▭ COUNTERPARTY SIGNER NAME  426
⊡ COUNTERPARTY SIGNER EMAIL
✎ COUNTERPARTY SIGNER SIGNATURE
▭ COUNTERPARTY SIGNER DATE FIELD

ESIGNATURE SIGNER REASSIGNMENT
⬤ ENABLED

SIGNATURE PACKET ⤶ 1235
DETERMINE WHICH DOCUMENTS WILL BE INCLUDED IN THE SIGNATURE REQUEST AND THE ORDER OF THE SIGNATURE PACKET.

▭ MARKETING CASE STUDY

⊙ INTERNAL SIGNER　　⊙˅
NO PROPERTIES    428

CONDITIONS
◉ IS VIDEO TESTIMONIAL
◉ IS WHITEPAPER

INTERFACE AND TOOL FOR CONFIGURING A CONTRACT WORKFLOW

CROSS REFERENCE TO RELATED APPLICATIONS

The present disclosure is related to and claims priority under 35 USC § 1.119(e) to U.S. Provisional Patent Application No. 62/892,330, entitled INTERFACE AND TOOL FOR CONFIGURING A CONTRACT WORKFLOW, and to U.S. Provisional Patent Application No. 62/892,295, entitled AUTOMATIC INTAKE OF ELECTRONIC MESSAGE CONTENT AND ATTACHMENTS INTO CONTRACT WORKFLOW, both to Jason Li et-al., and filed on Aug. 27, 2019, the contents of which are incorporated herein by reference, in their entirety, and for all purposes.

BACKGROUND

Field

The present disclosure generally relates to contract platforms enabling parties to elaborate and execute contractual documentation remotely. More specifically, the present disclosure is related to handling documents for approval and signing by one or more parties in a contract workflow.

Description of the Related Art

Current smart contract platforms lack a simple mechanism to interact with multiple parties to a contract seamlessly, in a manner transparent to at least the controlling party in the contract (e.g., different hierarchical levels of the organization preparing a contract document, or different individuals preparing or approving the different drafts, within the organization). As a result, confusion arises when parties use different platforms to communicate and exchange documents, ideas, and edits. Moreover, for any given enterprise, there is a lack of a unified platform that users can access to quickly create, modify, and adapt a contract template for multiple uses at different times, in different localities, and for different departments within the same organization.

SUMMARY

In a first embodiment, a computer-implemented method includes updating, in a server, a workflow in a contract based on an action by a remote user. The computer-implemented method also includes storing an updated version of the contract in a directory, and providing, to an approver remotely coupled with the server, a link to the updated version. Updating the workflow includes at least one of: selecting a governing law or any other type of field or constraint controlling the updated version of the contract, adding a conditional variable to the contract, the conditional variable configured to acquire a value based on an input from the remote user, or the approver, adding or removing a portion of the contract based on a value of the conditional variable in the contract and modifying a role for the approver.

In a second embodiment, a system includes a memory storing instructions and one or more processors configured to execute the instructions. The processor executes the instructions to modify, in a server, a role for at least one of an approver or a signer in a workflow associated with a contract, based on an action by a remote user, to store an updated version of the contract in a directory, to provide, to an approver remotely coupled with the server, a link to the updated version to provide, to a counterparty signer remotely coupled with the server, a final version of the contract when an approval is received from the approver, to generate a signed copy of the updated version upon receipt of a request from a signer, the signed copy comprising a signature certificate associated with the signer, and to store the signed copy of the updated version in a second directory.

In a third embodiment, a computer-implemented method includes identifying a field variable in a workflow associated with a contract, the field variable configured to acquire a value based on an input from a user having access to the contract, from a signer of the contract, or from an approver of the contract. The computer-implemented method also includes adding a conditional clause to the contract, the conditional clause predicated on the value of the field variable and generating an updated version of the contract based on the conditional clause and the input from the user having access to the contract, from the signer of the contract, or from the approver of the contract. The computer-implemented method also includes providing a link to the updated version of the contract to the user having access to the contract, to the signer of the contract, or to the approver of the contract, and generating a signed copy of the updated version upon receipt of a request from a signer, the signed copy comprising a signature certificate associated with the signer.

In a fourth embodiment, a non-transitory, computer-readable medium stores instructions which, when executed by one or more processors, cause a computer to perform a method, the method includes updating, in a server, a workflow in a contract based on an action by a remote user. The method also includes storing an updated version of the contract in a directory, and providing, to an approver remotely coupled with the server, a link to the updated version. Updating the workflow includes at least one of: selecting a governing law or any other type of field or constraint controlling the updated version of the contract and modifying a role for the approver.

In yet other embodiment, a system includes a memory storing instructions, and a means to execute the instructions to cause the system to modify, in a server, a role for at least one of an approver or a signer in a workflow associated with a contract, based on an action by a remote user, to store an updated version of the contract in a directory, to provide, to an approver remotely coupled with the server, a link to the updated version to provide, to a counterparty signer remotely coupled with the server, a final version of the contract when an approval is received from the approver, to generate a signed copy of the updated version upon receipt of a request from a signer, the signed copy comprising a signature certificate associated with the signer, and to store the signed copy of the updated version in a second directory.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 3 illustrates the dashboard of a contract platform, according to some embodiments.

FIG. 5 illustrates a screenshot of a dashboard for the contract platform including a search tool, according to some embodiments.

FIGS. 6A and 6B illustrate a screenshot of a dashboard for the contract platform including a signing tab, according to some embodiments.

FIG. 7 illustrates a screenshot of a dashboard for the contract platform including a conditional modification, according to some embodiments.

FIGS. 8A and 8B illustrate a screenshot of a dashboard for the contract platform generated from the attributes editor tool, according to some embodiments.

FIG. 9 illustrates a screenshot of a dashboard for the contract platform generated from a process editor tool, according to some embodiments.

FIGS. 11A-11D illustrate a screenshot of a contract platform including a contract approval page, according to some embodiments.

FIGS. 12A and 12B illustrate screenshots of a contract platform to configure a signature stage in a contract, according to some embodiments.

FIG. 13 illustrates a screenshot of a contract platform to configure an archive stage in a contract, according to some embodiments.

FIG. 14 illustrates a screenshot of a document editor tool in a contract platform, including a warning field, according to some embodiments.

In the figures, elements and steps denoted by the same or similar reference numerals are associated with the same or similar elements and steps, unless indicated otherwise.

DETAILED DESCRIPTION

Figure 1:
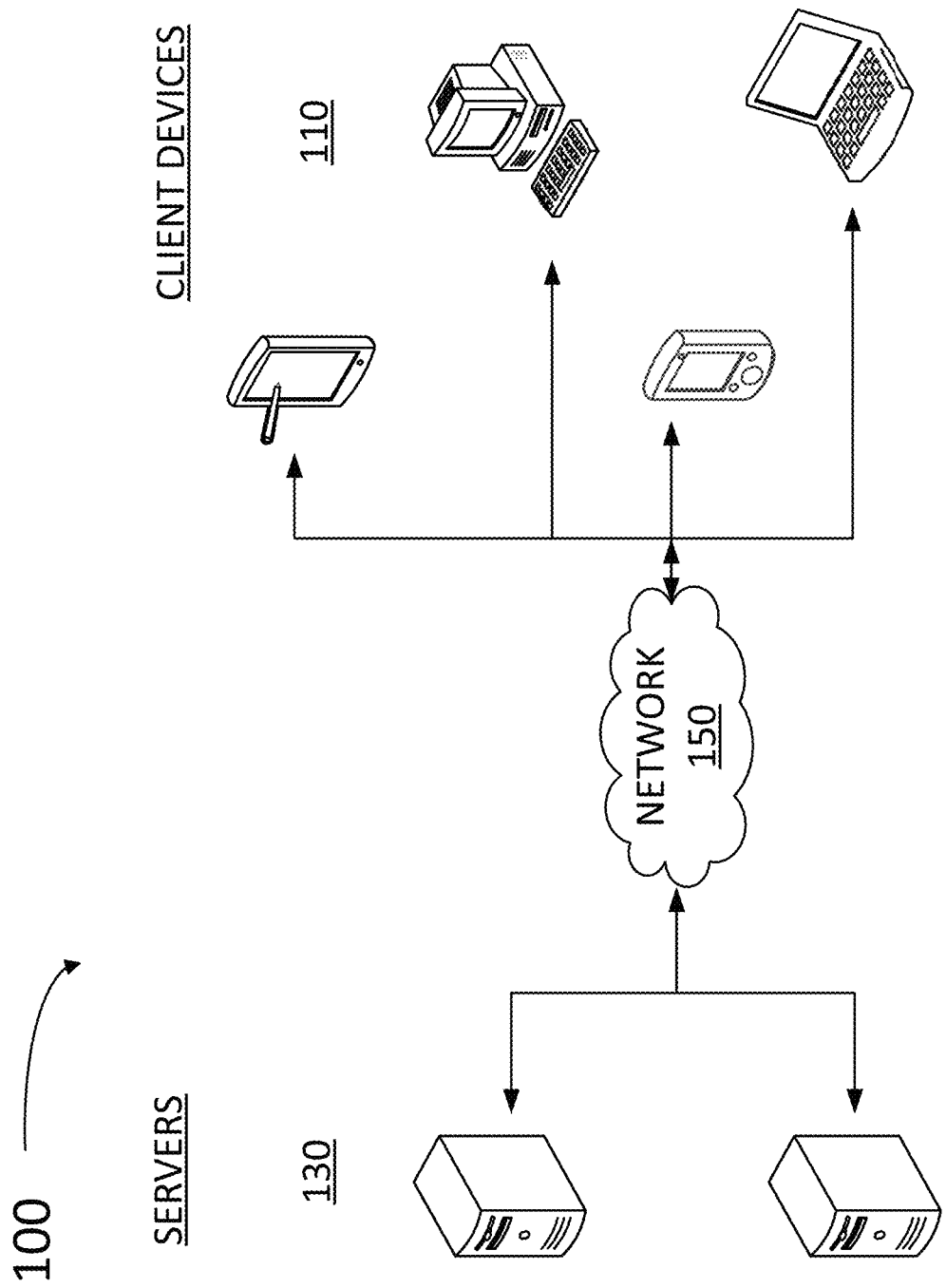
FIG. 1 illustrates an example architecture suitable for a smart contract workflow environment, according to some embodiments.

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure. Embodiments as disclosed herein should be considered within the scope of features and other embodiments illustrated in the Appendix (18 pp), filed concurrently herewith.

General Overview

Embodiments as disclosed herein provide a contract platform for the use of entities, organizations and individuals (e.g., a "controlling party," such as an enterprise, a business or corporation) that are interested in generating contracts for signing of other individuals or representatives of other entities (e.g., a "counterparty," such as an employee, a leaser, a buyer, and like). In some embodiments, an individual or organization may generate multiple contracts that are similar in nature, but differ in certain details (e.g., type of contract, counterparties, location of applicability, and the like). Accordingly, it is desirable for the controlling parties to have a tool that automatically generates, issues, collects and archives contract templates. It is also desirable to store the contracts in a database that may be accessible for reference and further use in additional contracts.

In contract platforms and other network applications, it is desirable to have a centralized tool that keeps an updated version of a contract draft and verifies the timely and confidential signing of the draft by the interested parties. The disclosed system addresses this problem specifically arising in the realm of computer technology by providing a solution also rooted in computer technology, namely, by providing a centralized verification process in which multiple networking platforms are monitored by a centralized server. In some embodiments, the monitoring involves data encryption and like technologies to verify legitimate parties to the contract, and that the contract or other documents exchanged between parties are not tampered with or eavesdropped by an external/illegitimate or unauthorized party.

The user of a platform as disclosed herein may create templates to be used in future workflows for similar types of contracts, e.g., a new employee contract for a different employee, or for a different enterprise, and the like. More generally, the user of a platform consistent with the present disclosure may create a contract template and workflow to be used repeatedly for a certain type of contract (e.g., employee contract, vendor contract, and the like). Additionally, in some embodiments, based on already existing templates, a user may create more workflows of similar types as necessary (e.g., employee agreements for a different class of employees).

Example System Architecture

FIG. 1 illustrates an example architecture 100 suitable for a smart contract workflow environment, according to some embodiments. Architecture 100 includes servers 130 communicatively coupled with client devices 110 over a network 150. One of the many servers 130 is configured with a memory including instructions which, when executed by a processor, cause the server 130 to perform at least some of the steps in methods as disclosed herein. In some embodiments, the processor is configured to manage a contract workflow upon request by the user of one of client devices 110. The contract workflow may include a contract document, and one or more counterparties that are signatory to the contract. Accordingly, server 130 may include an editor tool configured to create and modify documents in the contract workflow. For purposes of load balancing, multiple servers 130 can host memories including instructions to one or more processors, and multiple servers 130 can host a database that includes multiple contract workflows. Moreover, the contract workflow may be a collaborative project involving multiple users with client devices 110 accessing one or more servers 130 where one or more project documents are stored. In that regard, the user of client device 110 may be an enterprise owner, official, or supervisor, requesting server 130 to generate a contract workflow. In some embodiments, the user of client device 110 may be one or more collaborators assigned with at least one of multiple tasks in the contract workflow by server 130. Moreover, in some embodiments, multiple users of client devices 110 may include the project master and at least one collaborator assigned with a task in the contract workflow. Further, in some embodiments, a user of client device 110 is an executor or counterparty to the contract in the contract workflow. Accordingly, client devices 110 may communicate with each other via network 150 and through access to server 130 and resources located therein.

Servers 130 may include any device having an appropriate processor, memory, and communications capability for hosting the contract engine including multiple tools associated with it. A server 130 may be accessible by various client devices 110 over network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing the contract engine on one or more of servers 130. Network 150 can include, for example, any one or more of a local area tool (LAN), a wide area tool (WAN), the Internet, and the like. Further, network 150 can include, but is not limited to, any one or more of the following tool topologies, including a bus network, a star network, a ring network, a mesh network, a star-bus network, tree or hierarchical network, and the like. Network 150 may include a wired network (e.g., via fiber optic or copper wire, telephone lines, and the like) or wireless network (e.g., a cellular network, radio-frequency—RF-network, Wi-Fi, Bluetooth, and the like).

Figure 2:
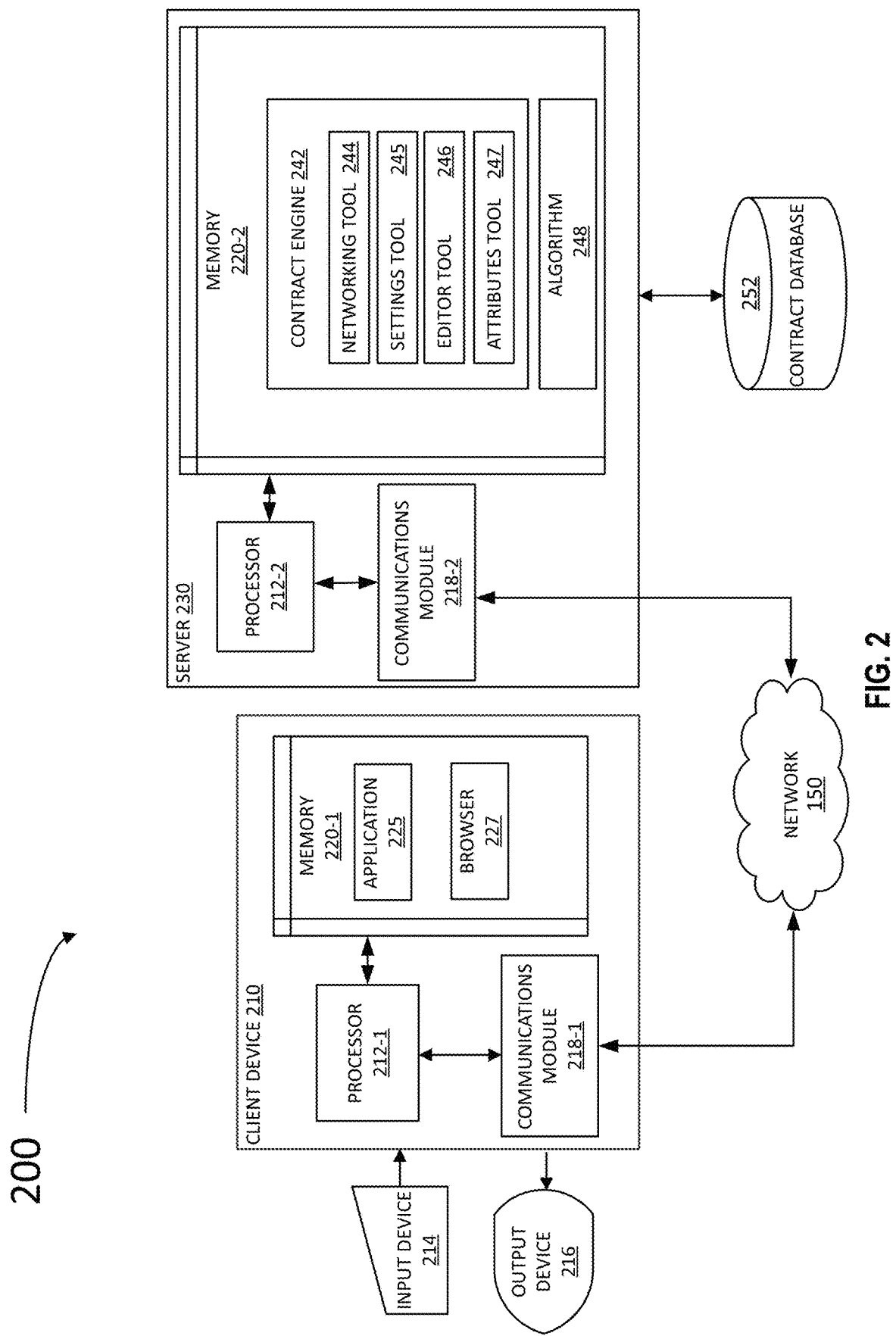
FIG. 2 is a block diagram illustrating an example server and client from the architecture of FIG. 1, according to certain aspects of the disclosure.

FIG. 2 illustrates an exemplary network architecture to provide a contract platform 200, according to some embodiments. Smart contract platform 200 includes a client device 210 and a server 230 communicatively coupled through network 150. Embodiments as disclosed herein provide contract platform 200 through a contract engine 242 in a memory 220-2 of server 230. Smart contract platform 200 serves enterprises and individuals who subscribe to the service, to create, manage, and store legal contracts with other counterparties. Each of the enterprise, individual, or any subscriber to the contract platform may access the platform through a client device as shown in the figure. Likewise, a counterparty to the contract may also receive and execute the contract from contract platform 200 via client device 210 communicatively coupled with the server. In some embodiments, a server as disclosed herein may also include an electronic messaging platform (e.g., an e-mail server) providing communication functionality between multiple client devices in the network.

Client device 210 may be any one of a mobile device, a laptop, a desktop, a palm or pad device, and the like. Server 230 may be a computing device such as a workstation, including one or more desktop computers or panels mounted on racks, and the like. The panels may include processing boards and also switchboards, routers, and other network devices. Client device 210 and server 230 may access each other and other devices in the network via communications modules 218-1 and 218-2 (hereinafter, collectively referred to as "communications modules 218"). Communications modules 218 may include radio hardware and software such as RF antennas, analog circuitry, digital to analog conversion circuits, and digital signal processing circuitry. In some embodiments, each of the client device or the server may be coupled to at least one input device 214 and an output device 216. Input device 214 may include a mouse, a keyboard, a pointer, a stylus, a touchscreen display, and a microphone. Output device 216 may include a display (e.g., the same touchscreen display as the input device), a speaker, an alarm, and the like.

Client device 210 and server 230 are generally computing devices, each of which includes at least a memory 220-1 or 220-2 (hereinafter, collectively referred to as "memories 220") storing instructions and a processor 212-1 or 212-2 (hereinafter, collectively referred to as "processors 212") configured to execute the instructions to perform, at least partially, one or more steps as described in methods disclosed herein. For example, memory 220-1 may include a browser 227, and a network application 225 hosted by server 230. Browser 227 or network application 225 may include commands for accessing contract platform 200 hosted by contract engine 242 stored in memory 220-2. Further, browser 227 or network application 225 may be configured to display a contract dashboard for a user of client device 210, upon access of a smart contract in contract engine 242. The contract dashboard may include multiple visual features and actionable icons and buttons that enable a party to review, edit, approve, or reject a contract in the contract platform via client device 210. The user of client device 210 may also send the contract workflow or at least a version of the contract workflow to a second party to the contract (e.g., a supervisor, and approver, or a counterparty), via the network. In that regard, at least one or more versions of the contract workflow may be stored in any one of memories 220, or in a contract database 252 communicatively coupled to server 230 and to client device 210 through network 150. Network application 225 may also include an electronic messaging application (e.g., an e-mail application, chat or instant messaging application, and the like) configured to send e-mails, chats, and instant text messages to other client devices through network 150.

Contract engine 242 includes multiple tools for execution by processors 212 to provide a contract platform as disclosed herein. Some of the tools in contract engine 242 may include a networking tool 244, a settings tool 245, an editor tool 246, and an attributes tool 247. Networking tool 244 may be configured to interact with the electronic messaging application in client device 210 to automatically include document attachments into a contract workflow so that different parties in a contract may exchange different versions of a document for review and signatures, seamlessly and transparently. In some embodiments, networking tool 244 may be part of a second server that is dedicated to electronic messaging through the network and that is communicatively coupled with contract engine 242 in server 230. Networking tool 244 may include a client account configured to receive e-mails from members of a client organization. The second server may be configured to communicate with the contract platform to handle attachments and documentation (including the content of forwarded messages) into new or existing workflows for contract documents. The contract documents may include contracts between the client organization and a third party. Accordingly, any member of the client organization may receive an electronic message from the third party, including context or attachments relevant to one or more contract workflows. In some embodiments, the member of the client organization may not have direct access to the contract platform, or may not be familiar with the procedures and technicalities of the contract engine. Accordingly, the member of the client organization may simply forward the electronic message received from the third party to the client account, so that the context of the electronic message and/or any relevant document may be seamlessly incorporated into a new or already existing workflow automatically, by networking tool 244.

Settings tool 245 may enable a user to create, update, or edit different configurations of a contract workflow, such as conditions, counterparties, reviewers, preferences, and access privileges to the contract workflow. Editor tool 246 may include a document editor tool (e.g., a text editor application and the like), configured to create, update, and edit a text version of a contract document. In some embodiments, editor tool 246 may allow maintaining different versions of a contract document, or a redlined version of a contract document. Moreover, in some embodiments, editor tool 246 may allow a user to select any two versions of a document and create a redline version based on a comparison of the two selected versions. Attributes tool 247 enables a user to select contract properties such as counterparties, dates, governing law, and jurisdictions. In some embodiments, attributes tool 247 may also enable the user to set up logical conditions and other requirements to the contract workflow. For example, in some embodiments, a logical condition may include selection of specific template language in a contract document (e.g., via editor tool 246) when the user selects a specific governing law, or location, or contract type. In this regard, the different tools in contract engine 242 collaborate with each other in a contract workflow to create a smooth and seamless workflow environment for the creators and issuers of the contract document, and also for the counterparties who sign/edit the contract document.

In some embodiments, memory 220-2 may include an algorithm 248 or code that includes mathematical and logical operations for the different tools in contract engine 242. Algorithm 248 may include a non-linear algorithm such as a neural network, an artificial intelligence, or machine learning algorithm, and is configured to resolve specific tasks according to a previous training using a carefully selected sampling universe. Some of the tasks for which algorithm 248 is trained may include semantic and syntax interpretation of a text, comparison between text documents, and correlating a text with a legal code to ensure that the text is consistent and complies with certain aspects of the legal code. In some embodiments, algorithm 248 may also include an encryption code configured to provide certificates, keys, and signatures to multiple users. Algorithm 248 may be configured to authenticate the certificates or signatures in documents returned by users, so that any tampering with the document or any unauthorized access may be identified and avoided.

FIG. 3 illustrates a dashboard 300 of a contract platform, according to some embodiments. Dashboard 300 may be part of a network application or browser accessing a contract engine in a server (e.g., contract engine 242 and server 230). Dashboard 300 includes multiple workflows 301-1, 301-2, through 301-10 (hereinafter, collectively referred to as "workflows 301") for contracts that the user has created for a given enterprise, or for a specific department or section of the enterprise. In that regard, dashboard 300 may be configured to give certain users access to a selected group of workflows 301, and restrict access to another group of workflows 301 based on a customizable set of privileges established for different users, or groups of users (e.g., "administrators," "everyone," "my special group," and the like).

Each of the user groups may have access to selected workflows 301, and with different degrees of authority and privileges (e.g., some users may also have permission to view, but not alter, the document, and the like).

Figure 4A:
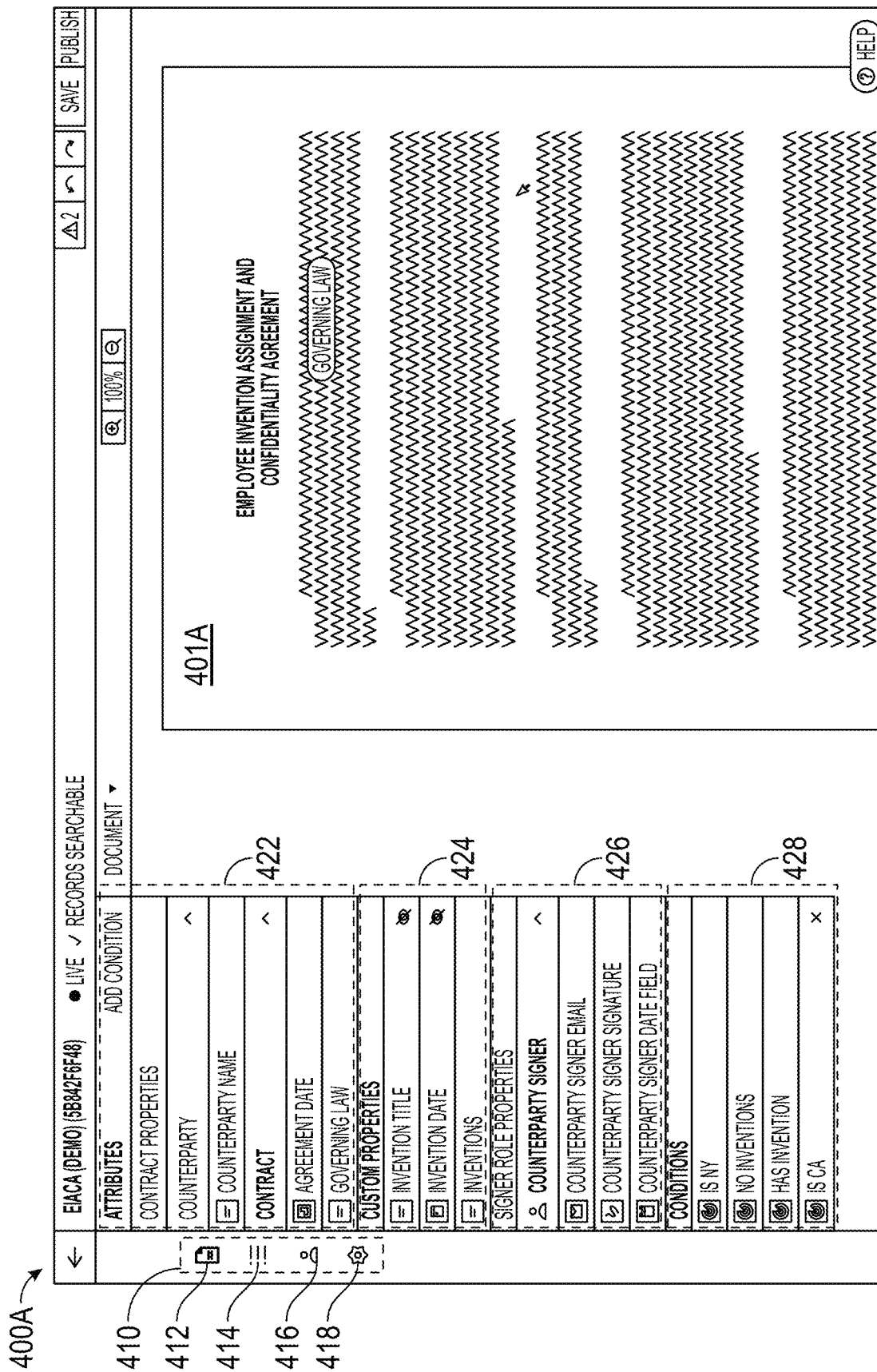
FIGS. 4A-4B illustrate a screenshot of a dashboard for the contract platform including an editor tool, according to some embodiments.

FIG. 4A illustrates a screenshot of a dashboard 400A for the contract platform including a sample contract 401A, according to some embodiments. In some embodiments, the dashboard is provided to a user of the platform who is preparing contract 401A. Contract 401A may be a person-to-person contract, an enterprise-to-person contract, an enterprise-to-enterprise contract, or any combination of the above. Dashboard 400A illustrates a text document that includes contract 401A. In some embodiments, the document for contract 401A may also indicate a redline version to illustrate changes made to the text of the document during the workflow. The document is flagged by tabs indicating action items available to the user via an editor tool 412 selected from a tools palette 410. In some embodiments, tools palette 410 may further include tools for editing a workflow. Tools palette 410 may include a document editor tool 412, an attributes tool 414, a people tool 416, and a settings tool 418. Document editor tool 412 displays the document in the main portion of the template (cf. dashboard 300).

In some embodiments, document editor tool 412 includes attributes 422 associated to a counterparty (e.g., contract properties). Attributes tool 414 may include a custom properties field 424, people tool 416 may include a signer roles and properties field 426, and settings tool 418 may include a conditions editor 428. The counterparty attributes field 422 may include a counterparty name and contract attributes including an agreement data and a governing law. The governing law may be the jurisdiction applied in the place of a signature of the contract by the party, unless otherwise specified in the contract. Custom properties 424 may include details that are contract-depending, such as "invention title," "invention date," and "inventors," when the contract is associated to an invention disclosure, a patent, and the like. In some embodiments, custom properties field 424 may include details that are specific to a type of contract being prepared, for example, an enterprise interested in signing up social media influencers may include a social media handle in the custom properties.

Signers for a contract as disclosed herein may be classified as "company" signers and "counterparty" signers. A company signer is a member of the enterprise of which the user is part, and a counterparty signer is a person external to the enterprise. In some embodiments, attributes 422 may include attributes for a counterparty signer, such as a counterparty signer e-mail address, a counterparty signer signature, or a counterparty signer date field. Conditions editor 428 may include a location condition (state, country, continent, geographic region, and the like), or other conditions specific to the type of contract or workflow (e.g., whether the counterparty has an invention, and the like).

In some embodiments, the user may open conditions editor 428 to create a condition linked to a certain point in the document that includes the contract. The condition may include one or more claims linked by "and/or," or other logical combinations. For example, a certain employment contract may include salary conditions such that when a salary offer is greater than a pre-selected range value, then a pre-determined management level is included as an approver of the contract. In some embodiments, the contract may include a certain discount offer in the purchase of a given product, and a condition may be set to list a higher management level for an approver when the monetary value of the discount is greater than a certain value.

Figure 4B:
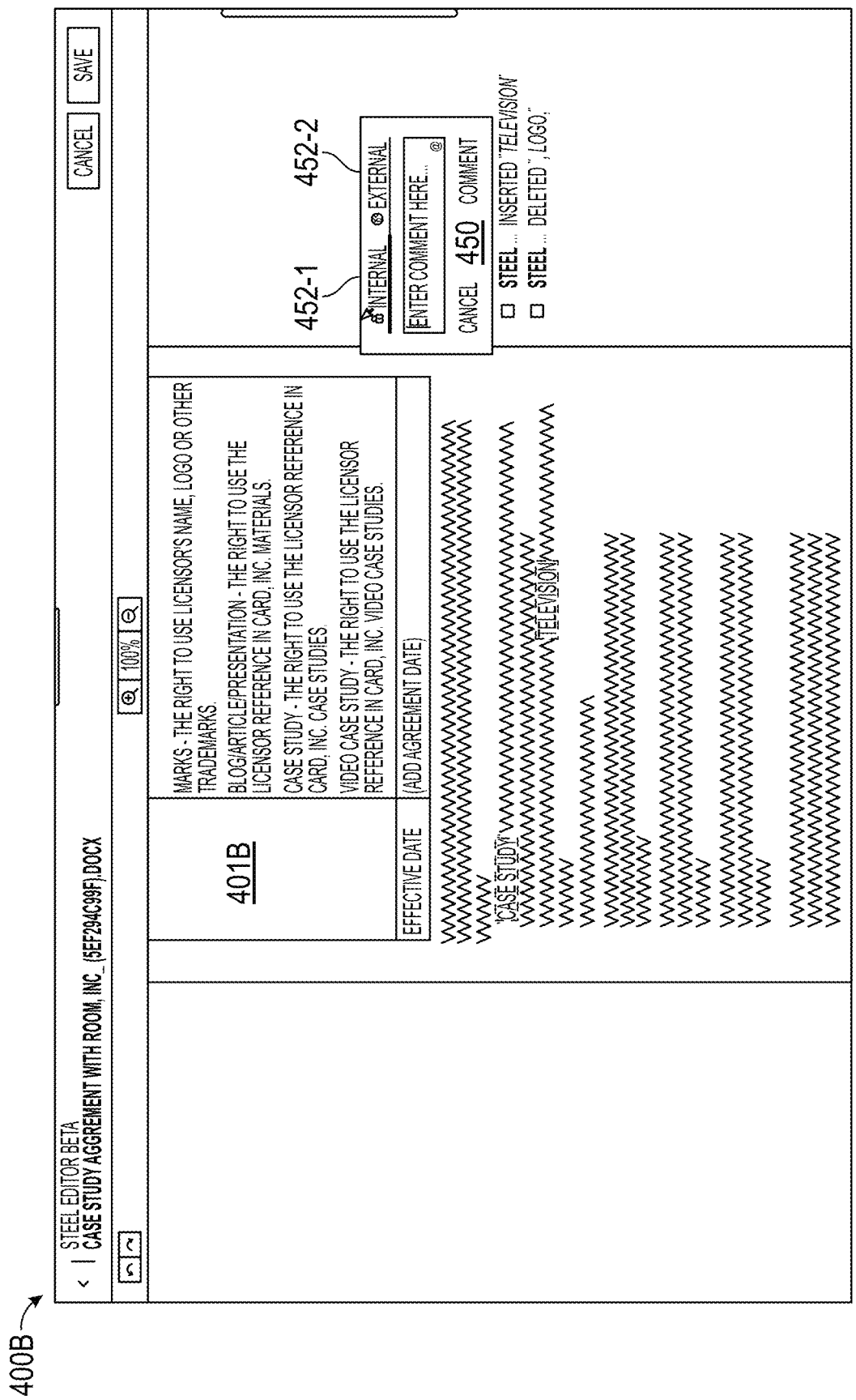

FIG. 4B illustrates a dashboard display 400B with an editor tool, according to some embodiments. Dashboard display 400B includes a document 401B (e.g., a text for a contract in a contract workflow) and enables a user to include comments 450, anywhere within document 401B. Comments 450 may be "internal" comments 452-1 or "external" comments 452-2.

Figure 5:
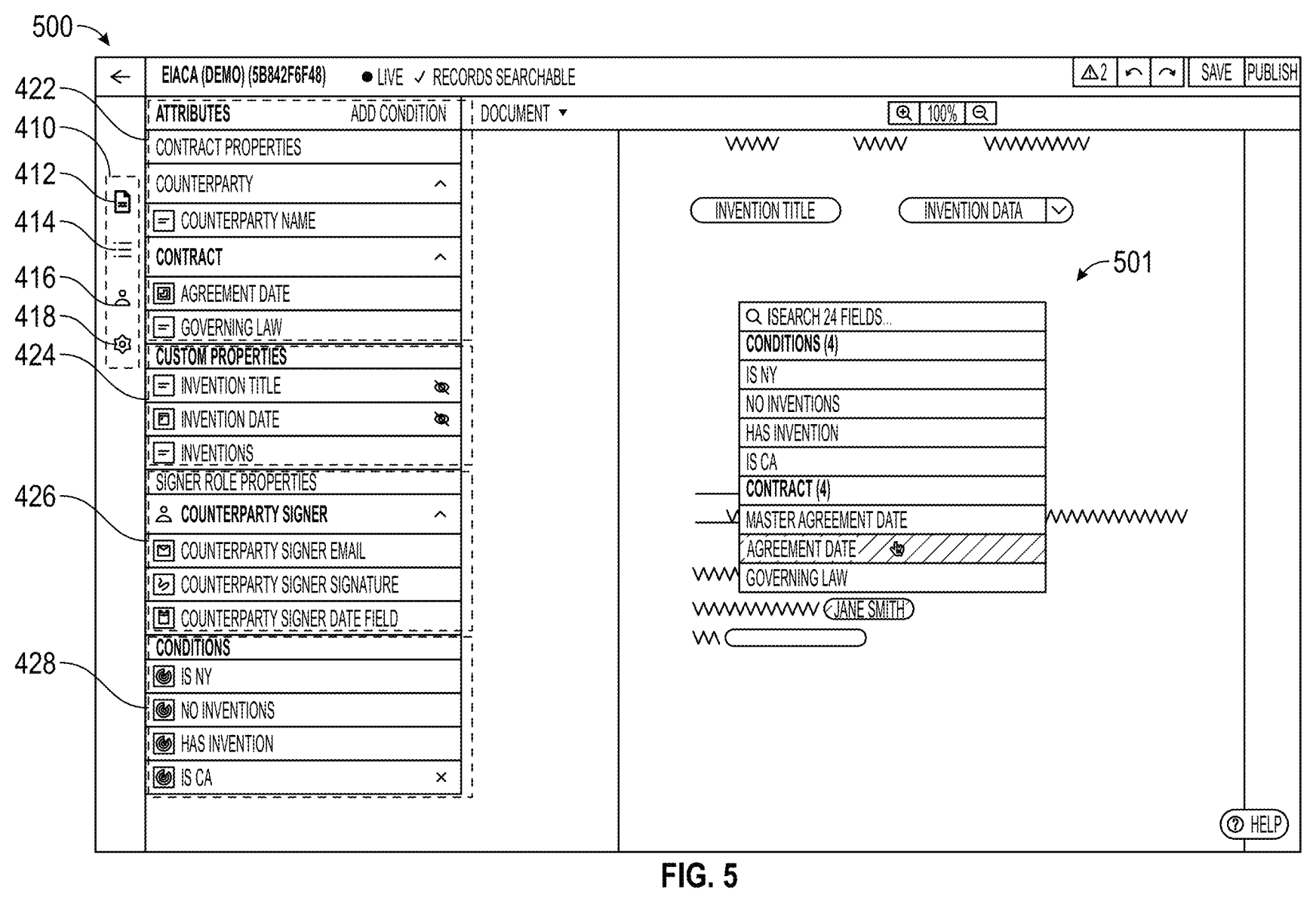

FIG. 5 illustrates a screenshot of a dashboard 500 for the contract platform including a search tool 501, according to some embodiments. Tools palette 410, document editor tool 412, attributes tool 414, people tool 416, and settings tool 418 are as described above. Document editor tool 412 includes attributes 422 associated to a counterparty (e.g., contract properties). Attributes tool 414 may include a custom properties field 424, people tool 416 may include a signer roles and properties field 426, and settings tool 418 may include a conditions editor 428, as described above.

Information stored in multiple workflows can be made searchable by the user. For example, when the user configures a new field variable in a contract, it may decide to let the field variable be searchable according to one or more attributes. The field variable may be configured to acquire a value based on an input from the user, from the signer, or from the approver of the contract. Search tool 501 allows the user to search, with the contract engine, the directory for one or more instances of the field variable within multiple workflows stored in the directory. The directory may be stored in a database (e.g., in contract database 252), and the user may have special privileges to access the directory. For example, a user that is part of a company or enterprise may have access to all directories and files in the database that involve the company or enterprise as one of the parties to a contract.

In some embodiments, the user may search in the archive of multiple workflows for a specific attribute of one or more field variables. For example, the search tool may identify different attributes that are associated with a workflow and that the user may be interested in searching, such as "Conditions" or "Contract." Search tool 501 may further provide more fine grained information associated with the attributes, such as "is NY," "no inventions," "has inventions," or "is CA," which may be attributes or values included in conditional clauses within one or more contracts in the contract database. In some embodiments, the search tool may be configured to look into "Contracts," with a subdivision among "Master Agreement Date," "Agreement Date," and "Governing Law." In some embodiments, search tool 501 is also configured to map certain attributes from multiple workflows into a new or different attribute or a new or different search category. Accordingly, in some embodiments, a single field variable may be found according to two different attributes (e.g., "salary" may be found through "Compensation" or "Monetary Value").

In some embodiments, the platform may allow the user to configure the variables that can be searched, as desired. For example, in some embodiments, the platform offers the user the ability to map data from different contracts/workflows to a same attribute, for search purposes. Accordingly, when the search is performed, all or at least one or more of the instances of the mapped variables will be available to the user.

Figure 6A:
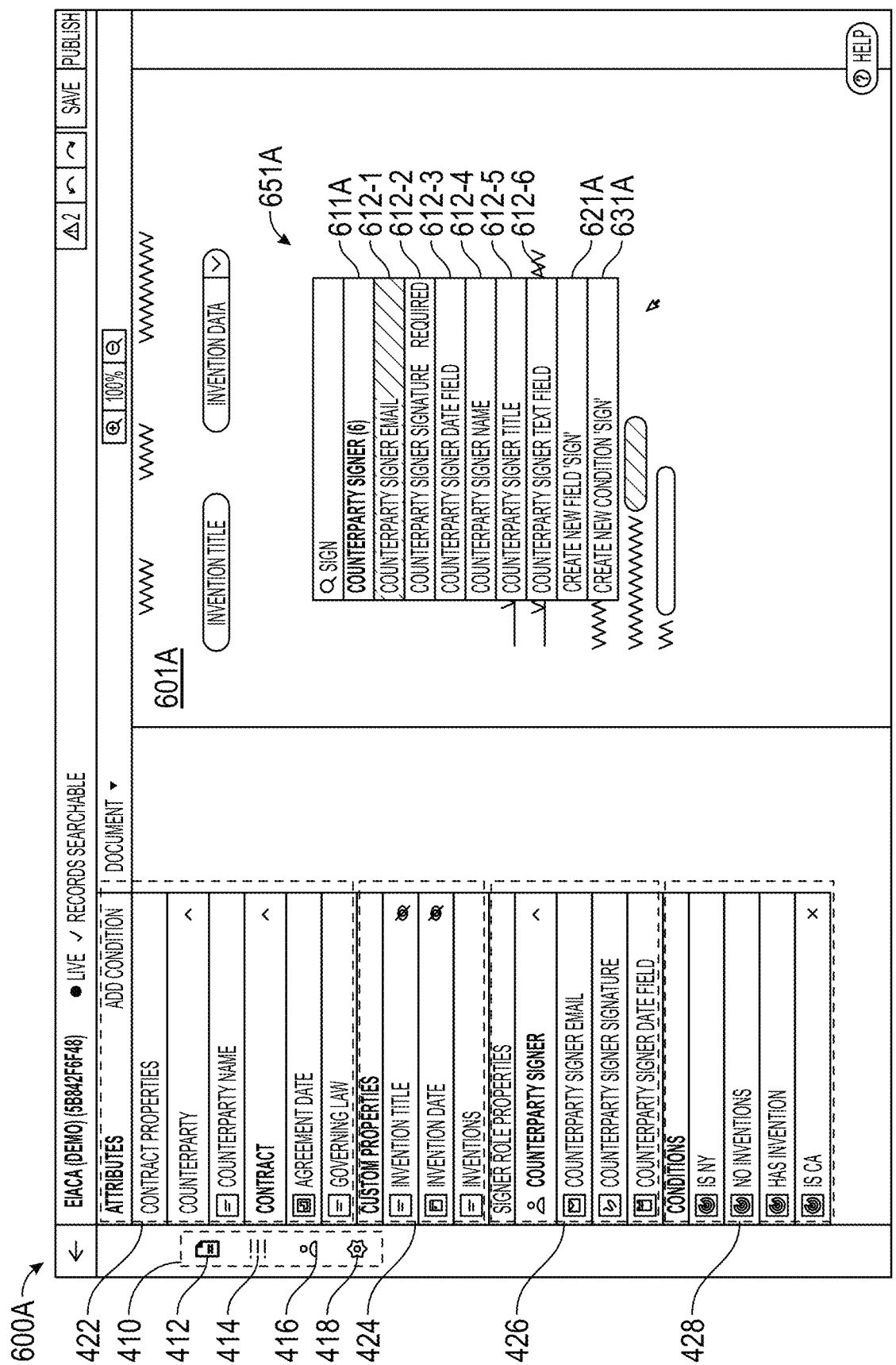
Figure 6B:
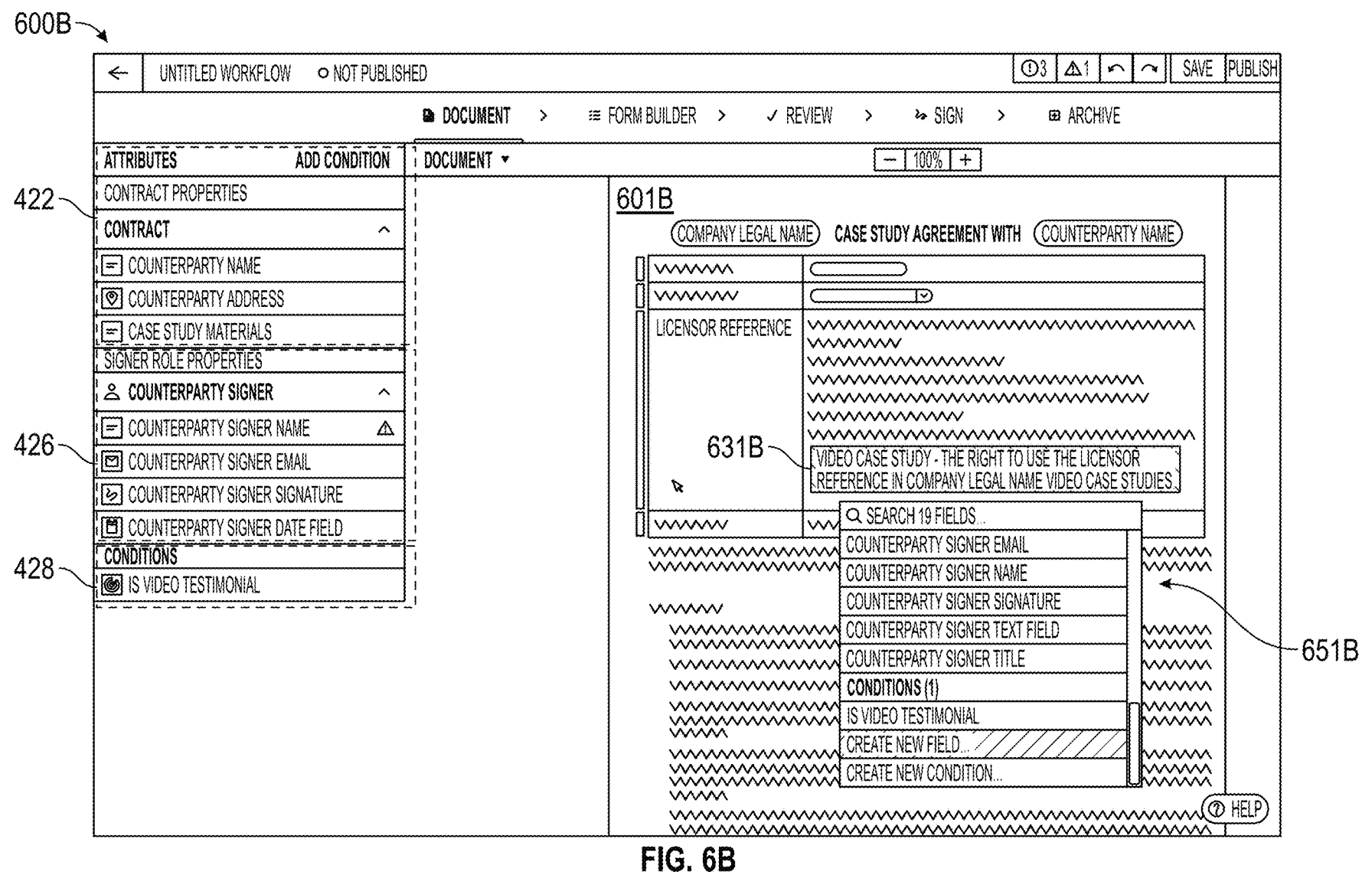

FIGS. 6A and 6B illustrate screenshots of dashboards 600A and 600B (hereinafter, collectively referred to as "dashboards 600") for the contract platform including search tabs 651A and 651B (hereinafter, collectively referred to as "search tabs 651"), according to some embodiments.

FIG. 6A illustrates a screenshot of a dashboard 600A for the contract platform including a search tab 651A, according to some embodiments. Tools palette 410, document editor tool 412, attributes tool 414, people tool 416, and settings tool 418 are as described above. Document editor tool 412 includes attributes 422 associated to a counterparty (e.g., contract properties). More generally, attributes 422 apply to contract properties associated with the counter party and to other aspects (first-party information, workflow information, and the like). Attributes tool 414 may include a custom properties field 424, people tool 416 may include a signer roles and properties field 426, and settings tool 418 may include a conditions editor 428, as described above. Search tab 651A enables the user to search for fields and field attributes throughout a document 601A.

In some embodiments, search tab 651A includes a counterparty signer menu 611A, a create new field sign tab 621A (to add a new counterparty signature), and a create new condition tab 631A (e.g., to include a conditional option for a given signature, such as an order of inclusion, and the like). Counterparty signer menu 611A may include different components in a signature, such as a counterparty signer e-mail field 612-1, a counterparty signer signature field 612-2, a counterparty signer date field 612-3, a counterparty signer name field 612-4, a counterparty signer title field 612-5, and a counterparty signer text field 612-6. In some embodiments, counterparty signer text field 612-6 may allow the counterparty to add comments, questions, or any other text additions to the signature, such as "job title," and other comments that may be deemed pertinent to that portion of the document.

The platform supports any number of company signers or counterparty signers to enable a range of contract use cases. The template also enables setting of specific signing conditions for each signer. Accordingly, a contract platform as disclosed herein enables flexible workflows including signers based on contract properties (workflow metadata). Signing conditionality may use one or more conditions established in conditional clauses to form question visibility, and for approvals. To assign company signatures, the user may select a company signer from any member or group in the company (e.g., from a pull-down menu, and the like). In some embodiments, the user may select a single static company signer (e.g., the general counsel or any other executive officer). In some embodiments, the user may configure a multiple-choice question that assigns a company signer based on a business selection when launching a new workflow.

In some embodiments, to assign a counterparty signer, the user follows a similar set of steps as described above. The user clicks on people tool 416 and then on "Add signer," within a menu display on people tool 416. The user selects a "Counterparty signer" and configures the name, order, and signing condition for the counterparty signer. The platform provides a "Document" tab to add a signature tag to the template. To configure a question for the signer (e.g., e-mail address and name), the platform provides the user with a "Form" tab. In some embodiments, the user may remove the name question. In some embodiments, the e-mail question is not removable.

In some embodiments, the user may create multiple conditional signers through a create new condition tab 631A, as follows. First, the user may create all signers (company/counterparty) as described above. In some embodiments, the signature tags may be added globally once all possible signers are created. The user then accesses attributes tool 414 in dashboard 600A. The platform provides a separate signature block for each possible signer. The user may wrap any selected signature block in conditions editor 428. In some embodiments, the conditional clause is the same condition selected for the signer in people tool 416.

FIG. 6B illustrate screenshots of dashboard 600B for the contract platform including a search tab 651B, according to some embodiments. Attributes field 422, signer roles and properties field 426, and conditions editor field 428 are as described above. Search tab 651B may enable the user to create a new field or a new condition. For example, in some embodiments the condition may be "is video testimonial" (cf. conditions editor 428) and the user may create and apply the condition to the highlighted text 631B in document 601B. Accordingly, highlighted text 631B will appear in document 651B when the condition "is video testimonial" in conditions editor 428 is true.

Figure 7:
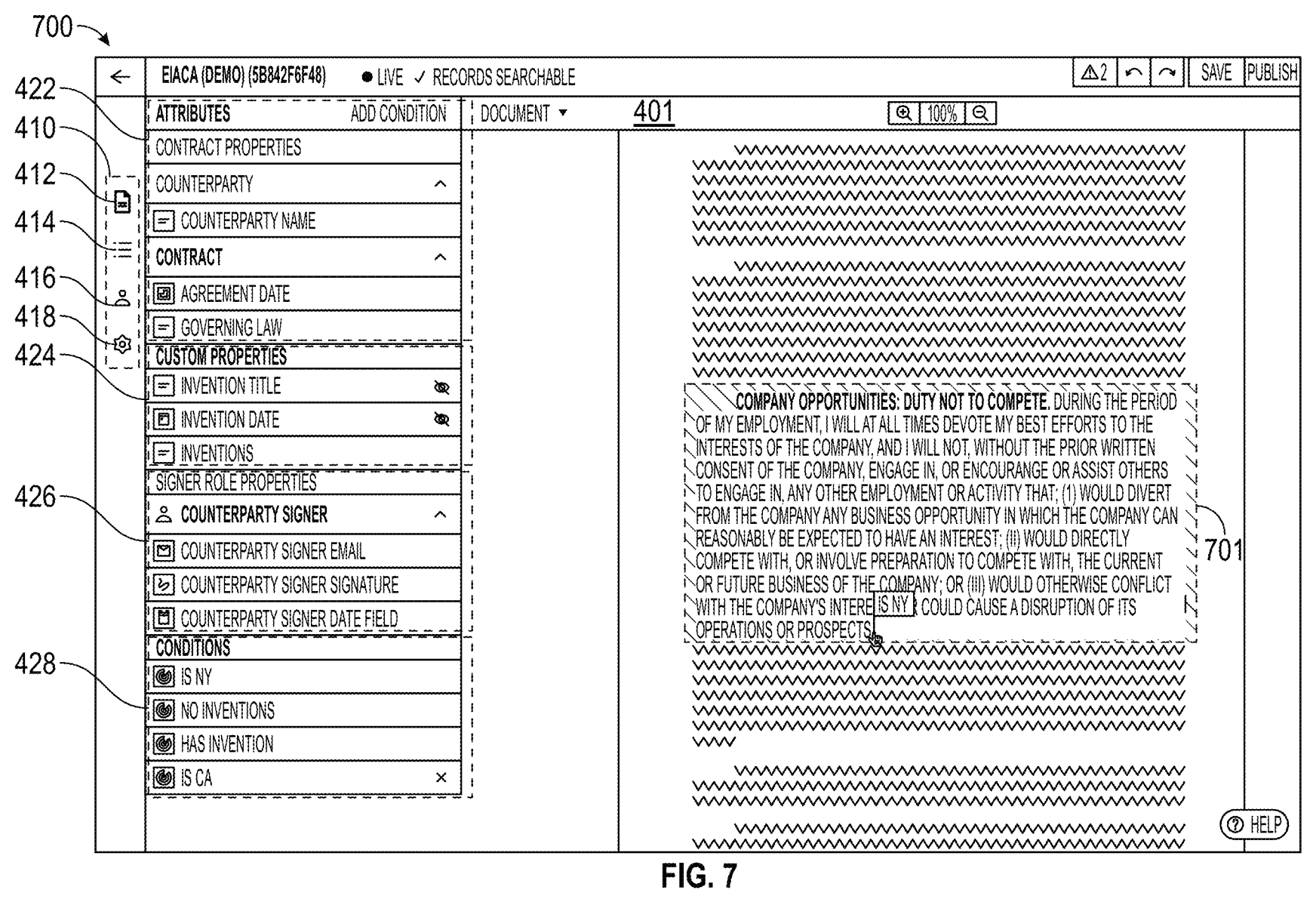

FIG. 7 illustrates a screenshot of a dashboard 700 for the contract platform including a conditional clause 701, according to some embodiments. Tools palette 410, document editor tool 412, attributes tool 414, people tool 416, and settings tool 418 are as described above. Document editor tool 412 includes attributes 422 associated to a counterparty (e.g., contract properties). Attributes tool 414 may include a custom properties field 424, people tool 416 may include a signer roles and properties field 426, and settings tool 418 may include a conditions editor 428, as described above.

The user selects editor tool 412 to access the text of contract 401A. The user then highlights, in the text of contract 401A, conditional clause 701 for which the condition is desired. The platform provides a menu including a list of already existing (e.g., previously created) conditions. When the condition associated to the highlighted text appears in the list, the user may select it. In some embodiments, the user may type a new name for the conditional clause and create a new condition in the list. The text highlighted in contract 401A becomes conditional clause 701 and the platform opens settings tool 418, allowing the user to see both the conditions editor 428 and the conditional clause 701 in contract 401A. Thus, the user may configure the new condition. For example, in some embodiments, conditional clause 701 may include a text portion included in contract 401A when the signatory party is in NY State, according to the laws of the state, or any other contract condition that applies to the location of the signatory party.

In some embodiments, conditions editor 428 may include an "IF" tab. The user then selects a form field from a pull-down list from the "IF" tab. The form field selected is the source of the conditional statement. In some embodiments, when the form field has not been defined in the workflow, the user may navigate to attributes tool 414, and create a desired form field. In that regard, the user may insert a new question in contract form 401A, which will pop up when the contract is prepared, reviewed, or approved. The user selects a form field to store the answers to the new question. In some embodiments, the user may export the value of the form field into a contract database (e.g., contract database 252). In some embodiments, the platform allows the user to add any number of applicable answers to the question (e.g., a multiple-choice question). Some of the form fields in the drop-down menu from the IF tab may include: "agreement date," "counterparty name," a question (e.g., Choose agreement date now?), Include Warranty, and the like. In some embodiments, conditions editor 428 may include "Advanced Conditions" wherein further Boolean combinations of one or more conditional statements may be formed (e.g., "AND"), and further includes rules modifying each condition or the combined selection.

The user may configure the answer for the condition by selecting an answer from a dropdown menu from the "IS" tab in conditions editor 428. In some embodiments, the answers that appear in the dropdown menu from the IS tab are the answers that the user configured when creating the question for the form field.

The user may then click the "save" button to create a conditional clause in the workflow. When the condition evaluates to false, the claim will not be included in the final document.

Figure 8A:
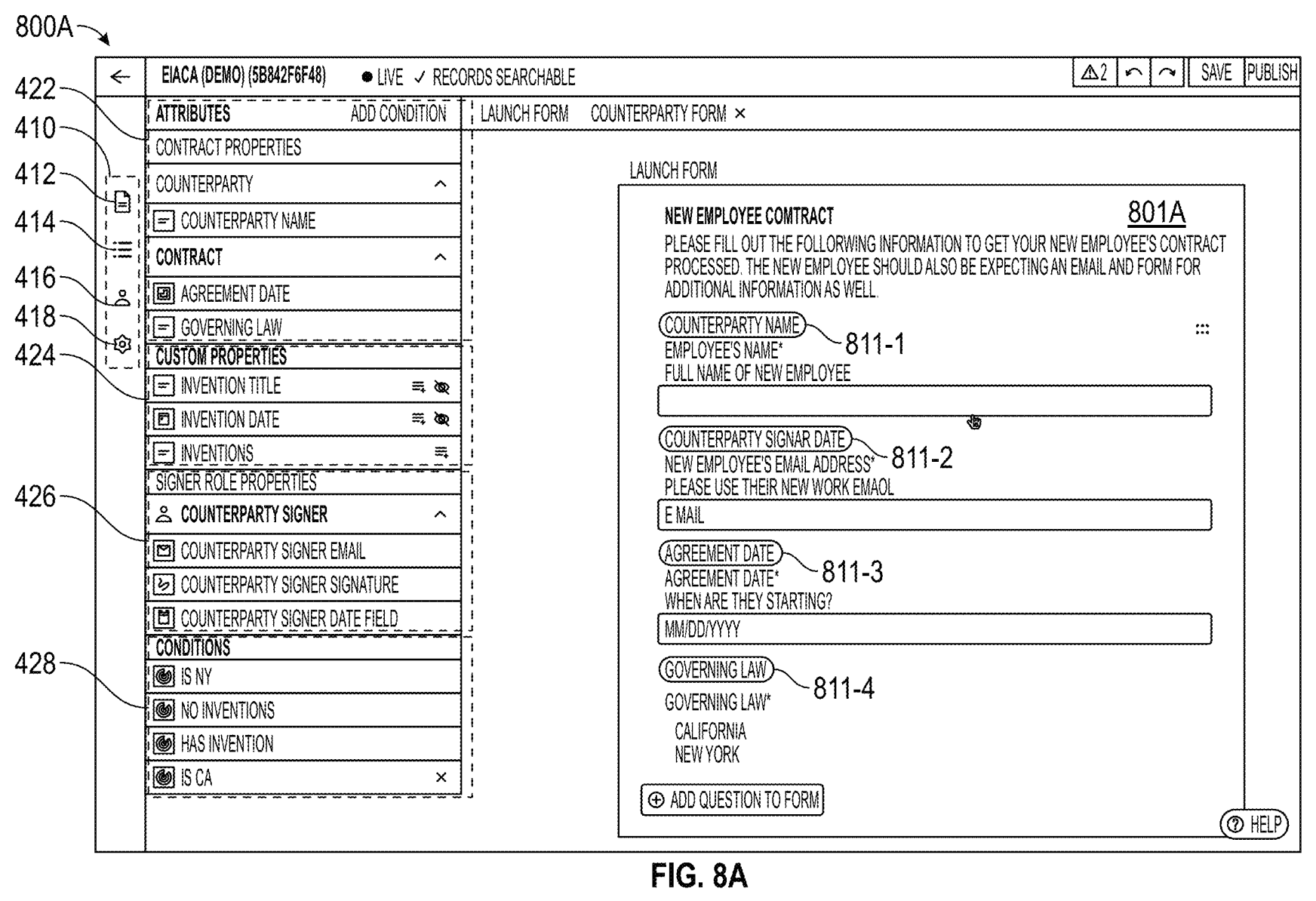
Figure 8B:
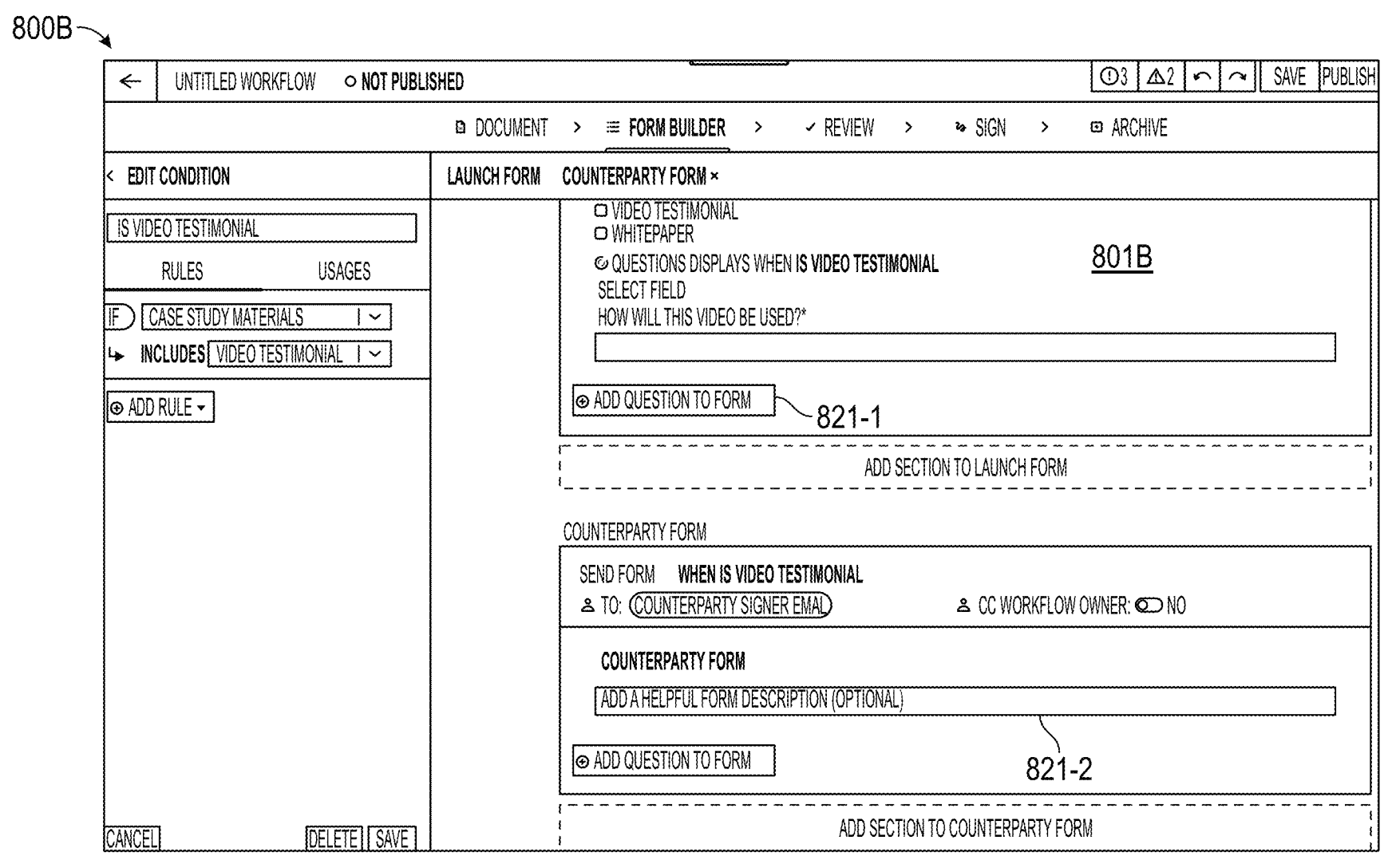

FIGS. 8A and 8B illustrate a screenshot of dashboards 800A and 800B (hereinafter, collectively referred to as dashboards 800) for the contract platform generated from the attributes editor tool, according to some embodiments.

FIG. 8A illustrates a screenshot of a dashboard 800A for the contract platform generated from the attributes tool 414, according to some embodiments. Tools palette 410, document editor tool 412, attributes tool 414, people tool 416, and settings tool 418 are as described above. Document editor tool 412 includes attributes 422 associated to a counterparty (e.g., contract properties). Attributes tool 414 may include a custom properties field 424, people tool 416 may include a signer roles and properties field 426, and settings tool 418 may include a conditions editor 428, as described above.

Attributes tool 414 may be used to generate a new workflow 801A or modify an existing workflow. Attributes tool 414 displays tabs and fields to be filled by a selected counterparty or authorized person for inclusion in the contract. Accordingly, attributes tool 414 ensures that the appropriate information included in the text of a contract is filled out by a knowledgeable and authorized party (e.g., legal counsel, enterprise manager, and the like).

In some embodiments, new workflow 801A may include a counterparty name 811-1, a counterparty signer e-mail 811-2, an agreement date 811-3, and a governing law 811-4 (hereinafter, collectively referred to as "contract variables 811"). Contract variables 811 may be shown in editor tool 412 as fill-in prompts in the contract document, so that the counterparty, an approver, or a preparer may fill them at a later time (e.g., during editing, review, or execution of the contract).

FIG. 8B illustrates a screenshot of dashboard 800B for the contract platform generated from the attributes editor tool, according to some embodiments. A form builder 801 in attributes tool enables the user to add a question to the form 821-1. The question may be included in the contract document for an approver or a counterparty to provide a response. In addition to a question, a user may include a comment 821-2 in the form. Comment 821-2 may include a note, or a helpful form description for the reviewer/counterparty.

FIG. 9 illustrates a screenshot 900 of a contract roles editor 901 for the contract platform generated from people tool 416, according to some embodiments. Tools palette 410, document editor tool 412, attributes tool 414, people tool 416, and settings tool 418 are as described above. Document editor tool 412 includes attributes 422 associated to a counterparty (e.g., contract properties). Attributes tool 414 may include a custom properties field 424, people tool 416 may include a signer roles and properties field 426, and settings tool 418 may include a conditions editor 428, as described above.

People tool 416 may assign contract roles to different participants in the workflow. People tool 416 enables the user to select people associated with the workflow, and the roles each of them assume. For example, some of the roles that may be selected include "approvers" role field 910, "signers" role field 920, and "archiver" role field 930. In some embodiments, approvers role field 910 may include a "legal" approver 912, or a "manager" approver 914 (e.g., a local/regional/global manager), and may further include one or more people. For example, the tabs in approvers role field 910 may include pull-down menus with a list of names of approvers, wherein one or more of the names may be selected. Further, the pull-down menu may include an option to add a new approver (not in the list), or to remove an approver from the list. In addition to listing the name and type of approvers, approvers role field 910 may also include conditional fields 916-1 and 916-2 (hereinafter, collectively referred to as "conditional fields 916"). Conditional fields 916 may include a menu of conditions or constraints for the approver role. For example, in some embodiments, an approver signature may be desired under all circumstances (e.g., "always," cf. conditional field 916-1). In some embodiments, an approver signature may be desired only in certain jurisdictions (e.g., "is NY," cf. conditional field 916-2). Other conditions may apply in conditions fields 916, such as the order in which approvers are desired to approve the document. An ordering condition may be desirable to avoid interferences and repetitious work on the part of approvers when a hierarchy of responsibilities and liabilities is well established within an organization.

Tabs in the signers role field 920 or archivers role field 930 may include pull-down menus enabling the user to include one or more people in the signers role and/or the archivers role. Signers role field 920 may also include a conditions field 926 that establishes desired conditional constraints to the signer role such as when, where, and in what order the signature is desired.

Figure 10:
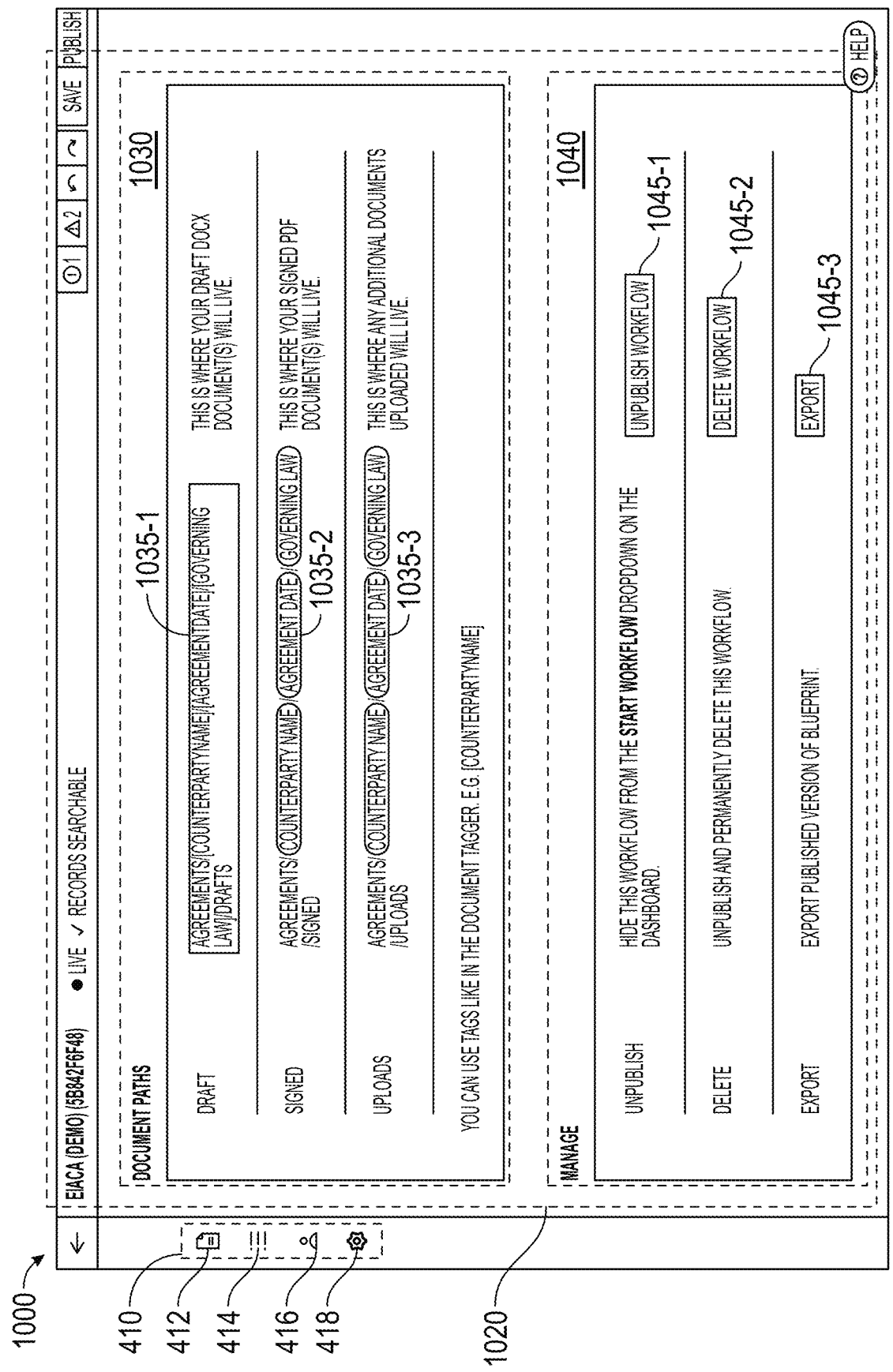
FIG. 10 illustrates a screenshot of a dashboard for the contract platform generated from a settings tool, according to some embodiments.

FIG. 10 illustrates a screenshot 1000 of a dashboard 1020 for the contract platform generated from settings tool 418, according to some embodiments. Tools palette 410, document editor tool 412, attributes tool 414, people tool 416, and settings tool 418 are as described above.

Settings tool 418 may include a document path selection 1030 for storing documents from a workflow, and a manage selection 1040. Document paths 1035-1, 1035-2, and 1035-3 (hereinafter, collectively referred to as "document paths 1035") may be selected for different types of documents, such as "drafts," "signed" documents, or "uploads." In some embodiments, document path selection 1030 allows variable values based on contract metadata entered either in the launch form of the contract document, or in a later, updated version.

Manage selection 1040 may include actions such as "un-publish" 1045-1, "delete" 1045-2, or "export" 1045-3 (hereinafter, collectively referred to as "manage actions 1045"), a document or an entire workflow from the platform. Accordingly, un-publish action 1045-1 may hide a workflow from a "Start Workflow" dropdown menu (cf. dashboard 300). Delete action 1045-2 may un-publish and permanently delete a workflow from a database (e.g., contract database 252). And export action 1045-3 may export a published version ("blueprint") of the workflow to a directory selected in any one of document paths 1035. In some embodiments, export action 1045-3 downloads on to a local computer (e.g., via a browser download) for easily copying a workflow definition.

Drafts are stored in a given directory. Once the draft is approved and signed by the counterparties, the signed document is stored in the signed directory. The uploads directory may include exhibits and ancillary documentation associated with a contract.

Figure 11B:
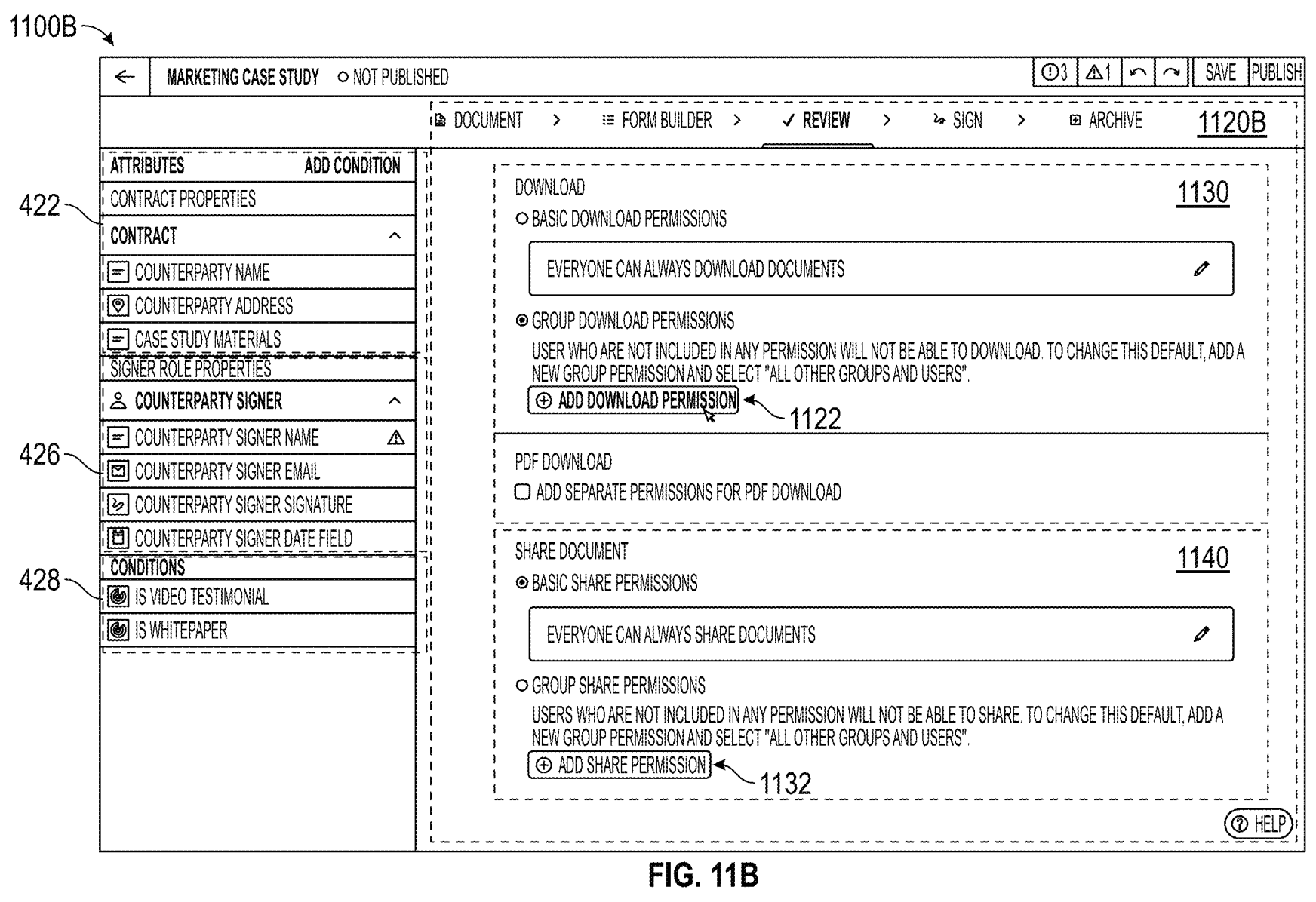
Figure 11C:
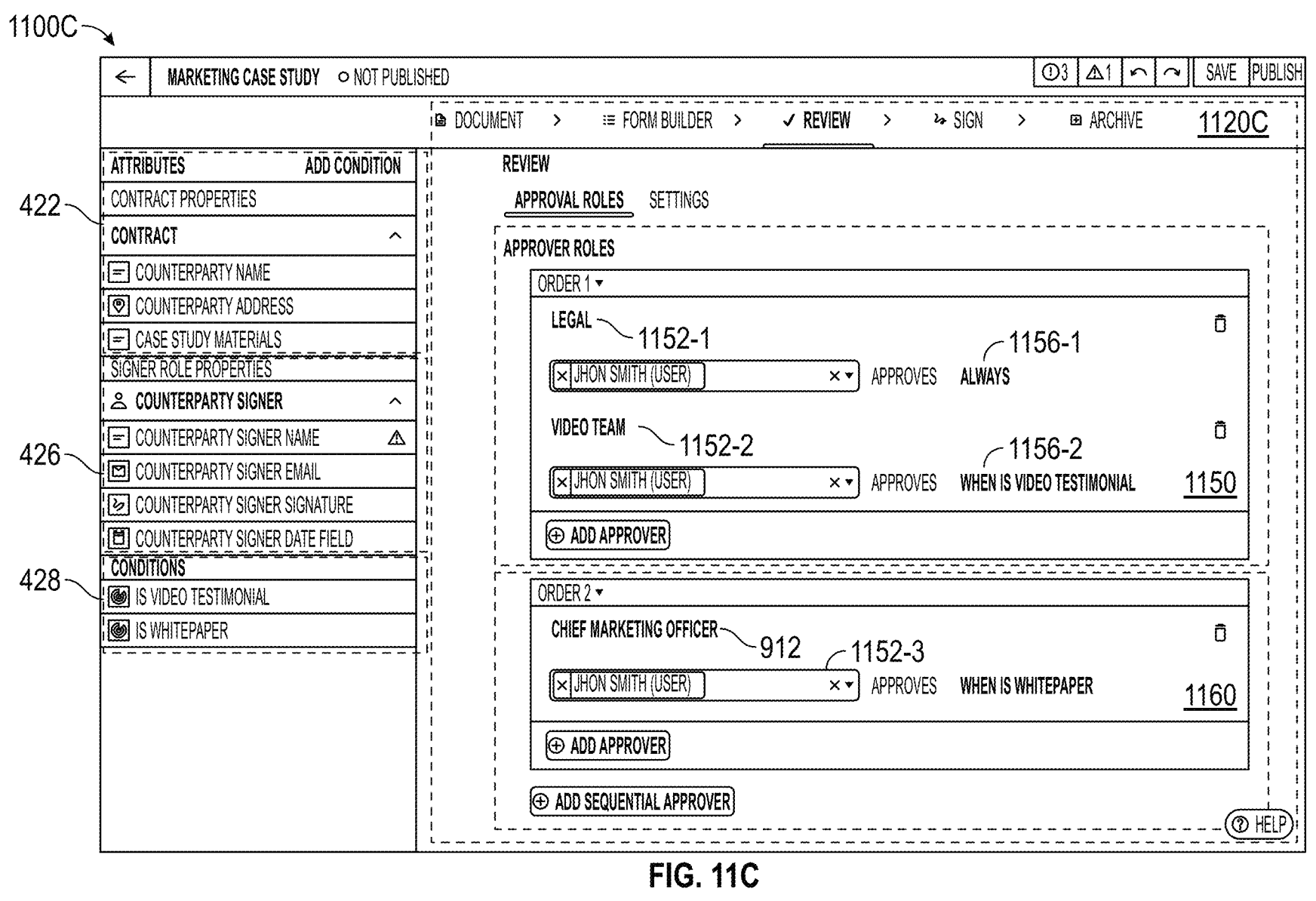

FIGS. 11A-11C illustrate screenshots 1100A, 1100B, 1100C and 1100D (hereinafter, collectively referred to as "screenshots 1100") for the contract platform including a contract approval page, according to some embodiments.

FIG. 11A illustrates a screenshot 1100A for the contract platform including a contract approval page 1101, according to some embodiments. Contract approval page 1101 may include a summary 1120 of events and attributes in the contract, and a workflow checklist 1128. Summary 1120 may include identification data for the signatory 1122, and other details 1124 about the contract such as agreement date, governing law, and other specifics (e.g., contract title, type, and the like). Summary 1120 may also include a link 1126 to an updated version of the document for approval.

Contract approval page 1101 includes a review and charge field 1112 with link 1126, and an "approve" button 1113. Contract approval page 1101 is accessed by the "approvers" of the contract, before the "signer(s)" have executed the signature. The approvers of the contract may include a manager, or a legal counsel of the enterprise handling the contract. When the approver is satisfied with the contract, the approval is enacted by clicking approve button 1113. A field 1114 in contract approval page 1101 includes a list of the approvers and an updated state of the approval status: "Pending/Approved/Modified," as the case may be. In some embodiments, one or more approvers may be listed, and the contract be issued to the signers only after all approvers have approved the contract. Moreover, in some embodiments, the user may set up the workflow such that a list of approvers is prompted to approve the contract in a given sequence, where the order of approval is relevant. Accordingly, in some embodiments, approver 2 may be requested to approve the contract only after approver 1 has approved, and the like. In some embodiments, at least one of the approvers may decide to modify at least one or more of the terms of the contract. In such case, the platform provides a screen with a fill out form where the approver can specify the desired modifications, and even add a comment or observation explaining the changes. When a change in the contract is performed by at least one of the approvers, the contract may be updated such that one or more of the attributes may be changed (e.g., one or more of the approvers may no longer be necessary, or the text document may be altered to introduce language relevant to a new jurisdiction, and the like).

When the contract receives approval from all approvers, it is ready for publication (e.g., transmitting the contract document to the signers, for execution). In some embodiments, the user may activate an error search in the document prior to publication. The error search may include a revision by a platform engine of the multiple elements in the contract, to check for consistency and other obvious omissions within the document. In some embodiments, the platform engine may apply a machine learning or artificial intelligence technique to determine whether the document is semantically consistent, logic, and it has no legal or procedural conflict. In some embodiments, an activity feed field 1116 may allow the user (e.g., one of the approvers of the contract, or the preparer), to add a comment, question, instruction, or any other textual entry into contract approval page 1101.

In some embodiments, screenshot 1100A may also include a workflow checklist 1128 indicative of a given status of the contract workflow (e.g., "create," "review," "sign," and "archive"). For example, in a "create" status, the user may include a preparer of a contract, in a "review" status, the user may include an approver of the contract, in a "sign" status, the user may include a party or counterparty to the contract, and in an "archive" status, the user may include a preparer of a new contract. Accordingly, the user accessing screenshot 1100A may have an overview of the workflow status. In addition, workflow checklist 1128 may include a tab that the user may activate to send one or more electronic messages to a workflow record in a database (e.g., contract database 252), to be added to a workflow feed.

FIG. 11B illustrates screenshot 1100B of a contract platform to configure a review stage 1120B in a contract, according to some embodiments. Attributes field 422, signer roles and properties field 426, and conditions editor field 428 are as described above. In review stage 1120B, a download field 1130 includes settings such as basic download permissions and group download permissions, and the ability for the user to add download permissions to the workflow 1122. A share document field 1140 includes basic share permissions and group share permissions, and enables the user to add share permissions 1132.

FIG. 11C illustrates screenshot 1100C of a contract platform to configure a review stage 1120C in a contract, according to some embodiments. Attributes field 422, signer roles and properties field 426, and conditions editor field 428 are as described above. In review stage 1120C, multiple order blocks may be established for different approval stages. Accordingly, certain approvers may be allowed sign off on the workflow (order block 2) only after other approvers have signed off (order block 1). In some embodiments, the user may select multiple approvers to sign in parallel, or overlapping in time (e.g., the signature or lack thereof of one approver may not preclude another approver from signing).

A first order field 1150 includes addresses and other details of workflow approvers, such as a team 1152-1 ("legal") or 1152-2 ("video team"), and a conditional clause for the approval 1156-1 ("always") or 1156-2 ("when a video testimonial is included in the workflow"). A second order field 1160 may include a higher order official 1152-3 for approval (e.g., the Chief Marketing Officer of the controlling party).

FIG. 11D illustrates screenshot 1100D of a contract platform to configure a review stage 1120D in a contract, according to some embodiments. In review stage 1120D, an entry 1175 may be created or modified for a team (e.g., "video team") by selecting specific members of the team from a pull-down menu 1180.

Figure 12A:
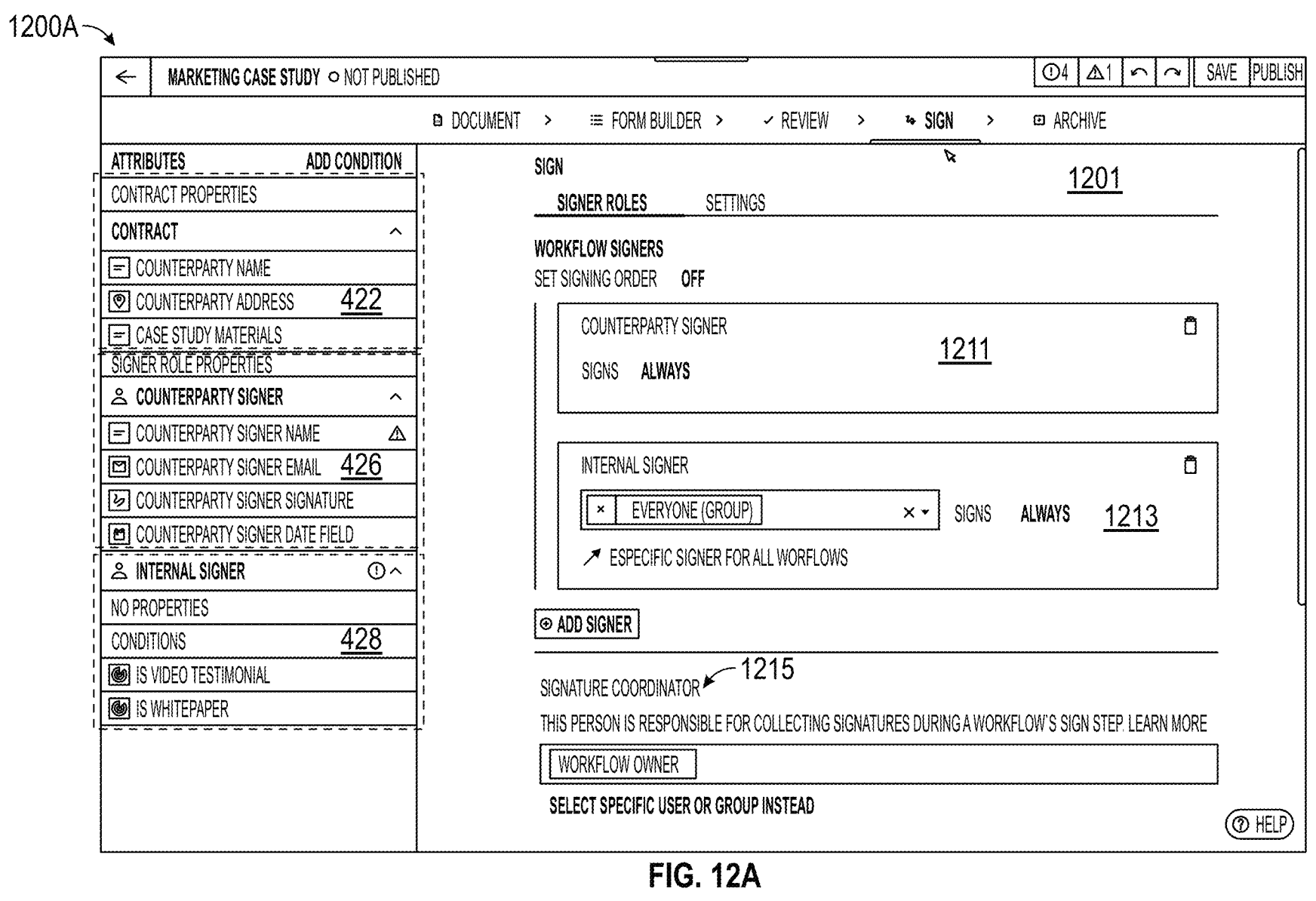

FIGS. 12A and 12B illustrate screenshots 1200A and 1200B (hereinafter, collectively referred to as "screenshots 1200") of a contract platform to configure a signature stage 1201 in a contract, according to some embodiments. Attributes field 422, signer roles and properties field 426, and conditions editor field 428 are as described above.

A counter signer field 1211 includes details about the countersigner party to the contract, including a conditional clause (e.g., "signs always" and the like). The user may add/remove counterparty signers, and modify the conditional clauses in signature stage 1201. An internal signer field 1213 includes details about an internal signer (e.g., within the organization issuing the contract, or controlling party). In some embodiments, signature stage 1201 allows the user to select a signature coordinator 1215, who is responsible for collecting signatures during a workflow sign step.

In some embodiments, signature stage 1201 may allow the user to create or modify settings such as a signature process 1225. For example, signature process 1225 may include a packet request trigger that requests approval of the signature coordinator to send out an eSignature request to the counterparties, or to automatically send the request once all the approvals have been collected. An eSignature signer reassignment may also be enabled/disabled in signature stage 1201. The eSignature request may include a signature packet 1235 that has the contract and other relevant documents for the counterparty. In some embodiments, signature stage 1201 may include uploading "wet" signatures (e.g., handwritten by a counterparty) as scans.

Figure 13:
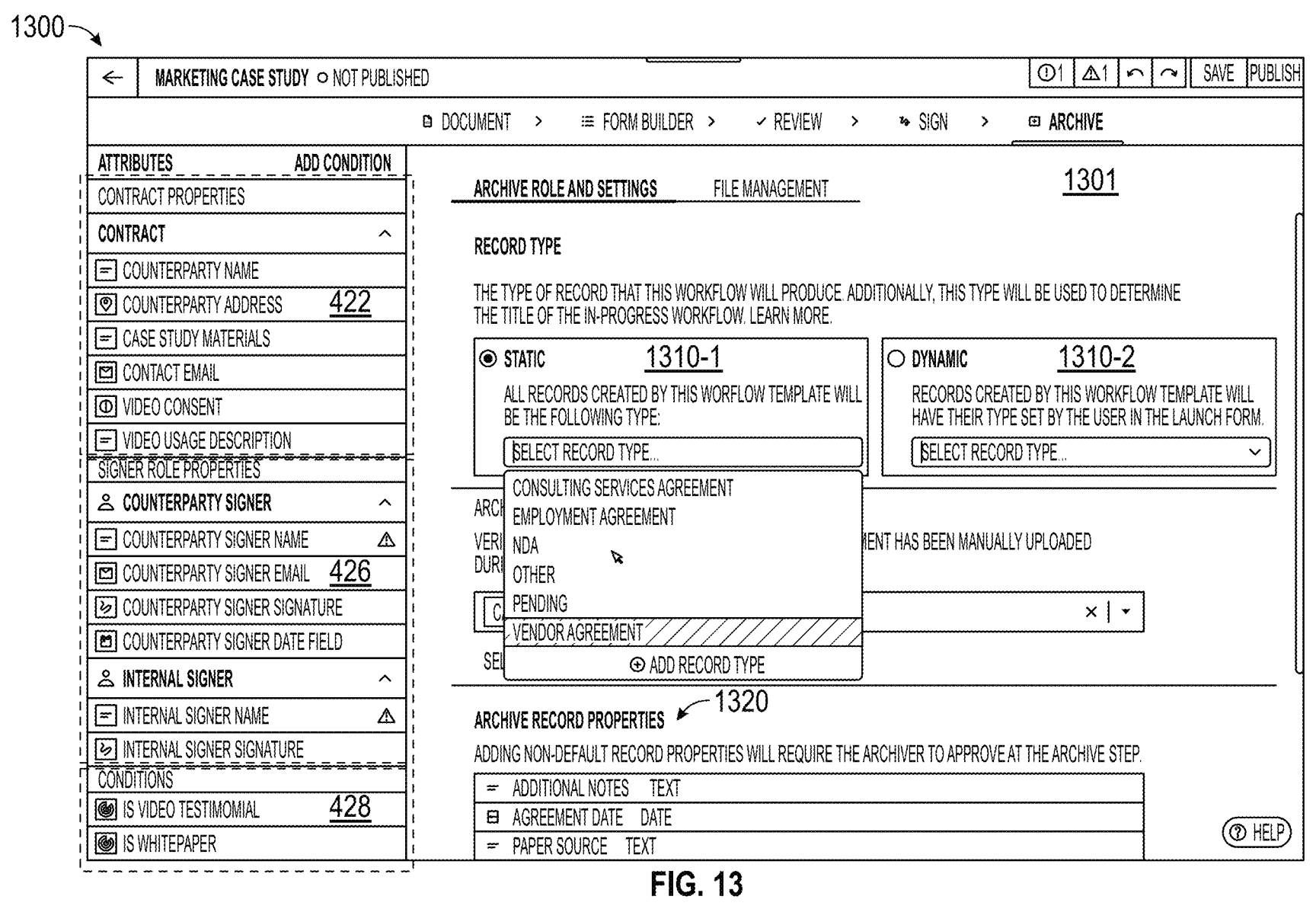

FIG. 13 illustrates a screenshot 1300 of a contract platform to configure an archive stage 1301 in a contract, according to some embodiments. Attributes field 422, signer roles and properties field 426, and conditions editor field 428 are as described above. In some embodiments, archive stage 1301 may enable the user to select a record type for the workflow as a "static" record type 1310-1, or a "dynamic" record type 1310-2 (hereinafter, collectively referred to as "record types 1310"). Static record type 1310-1 may establish all, or a portion, of the record in the workflow to have a selected type (e.g., "employment agreement," "NDA," "Vendor Agreement," "Pending" and the like). Dynamic type record 1310-2 may be set by the user in a launch form or later in the process, for each workflow independently.

Archive stage 1301 may also allow the user to create or modify archive record properties 1320, such as adding default properties that may request an approval from an authorized user (e.g., the "Archiver").

Figure 14:
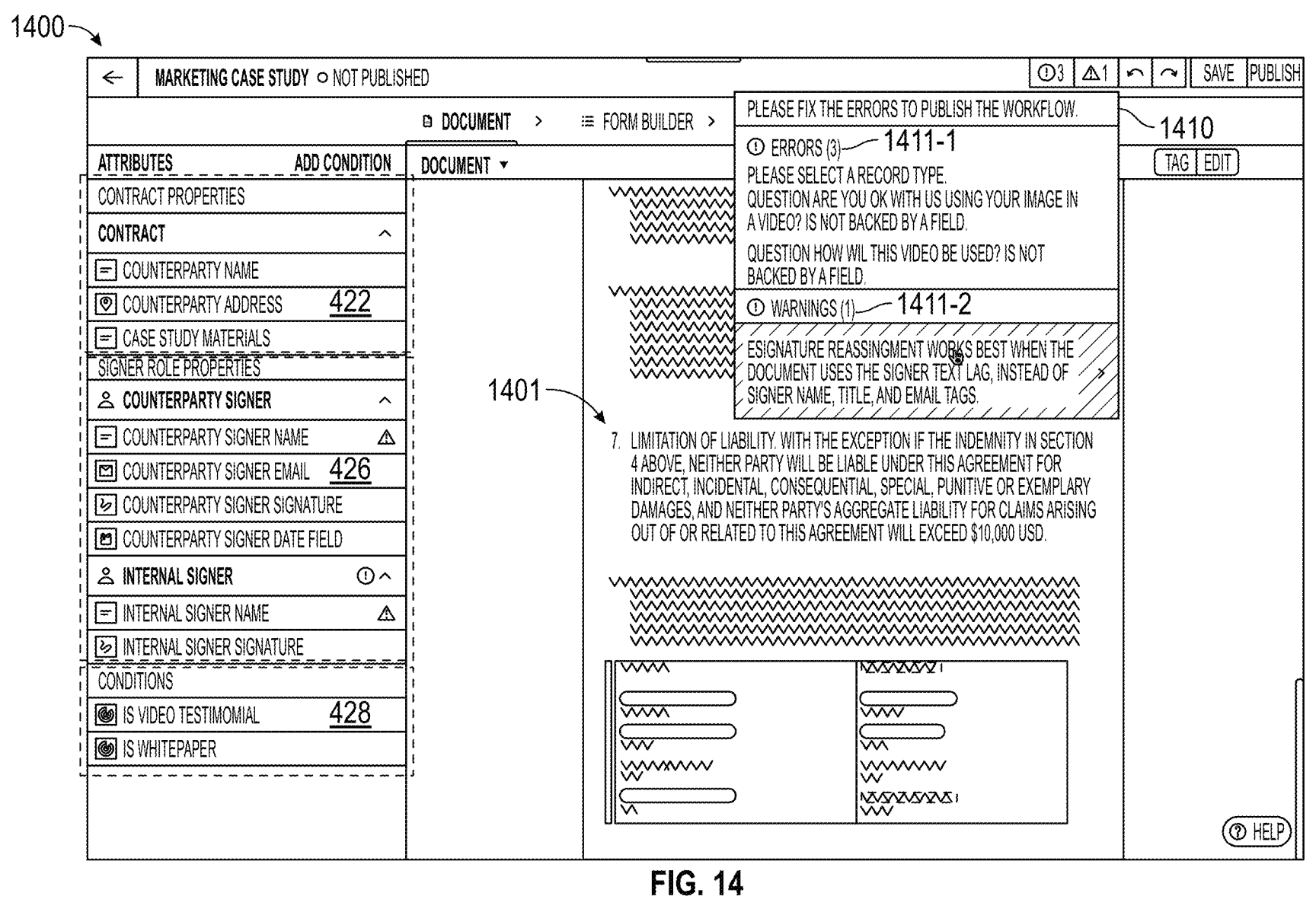

FIG. 14 illustrates a screenshot 1400 of a document editor tool in a contract platform, including a warning field 1410, according to some embodiments. Attributes field 422, signer roles and properties field 426, and conditions editor field 428 are as described above. Warning field 1410 may include errors 1411-1 and warning 1411-2 (hereinafter, collectively referred to as "flags 1411). Flags 1411 may be detected by an algorithm (e.g., algorithm 248) and may be associated with unfulfilled document requirements, missing signatures, inconsistencies in names and descriptions, or more technical details, such as legal or contextual inconsistencies in a contract 1401A, and the like. An error 1411-1 may be such that the contract platform may prevent the workflow to complete a signature stage. A warning 1411-2 may indicate a potential problem or inconsistency but the contract platform may still allow the workflow to proceed (e.g., after requesting an approver signature or check).

In some embodiments, warning field 1410 may also include suggestions for resolving the conflicts in flags 1411, or an explanation of error 1411-1 or warning 1411-2. In some embodiments, the contract platform may suggest edits or changes to document 1401A or to the workflow, for overcoming flags 1411. In some embodiments, warning field 1410 includes active links so the user may be directed to the place in document 1401A or in the workflow where the flag is located and highlighted.

Figure 15:
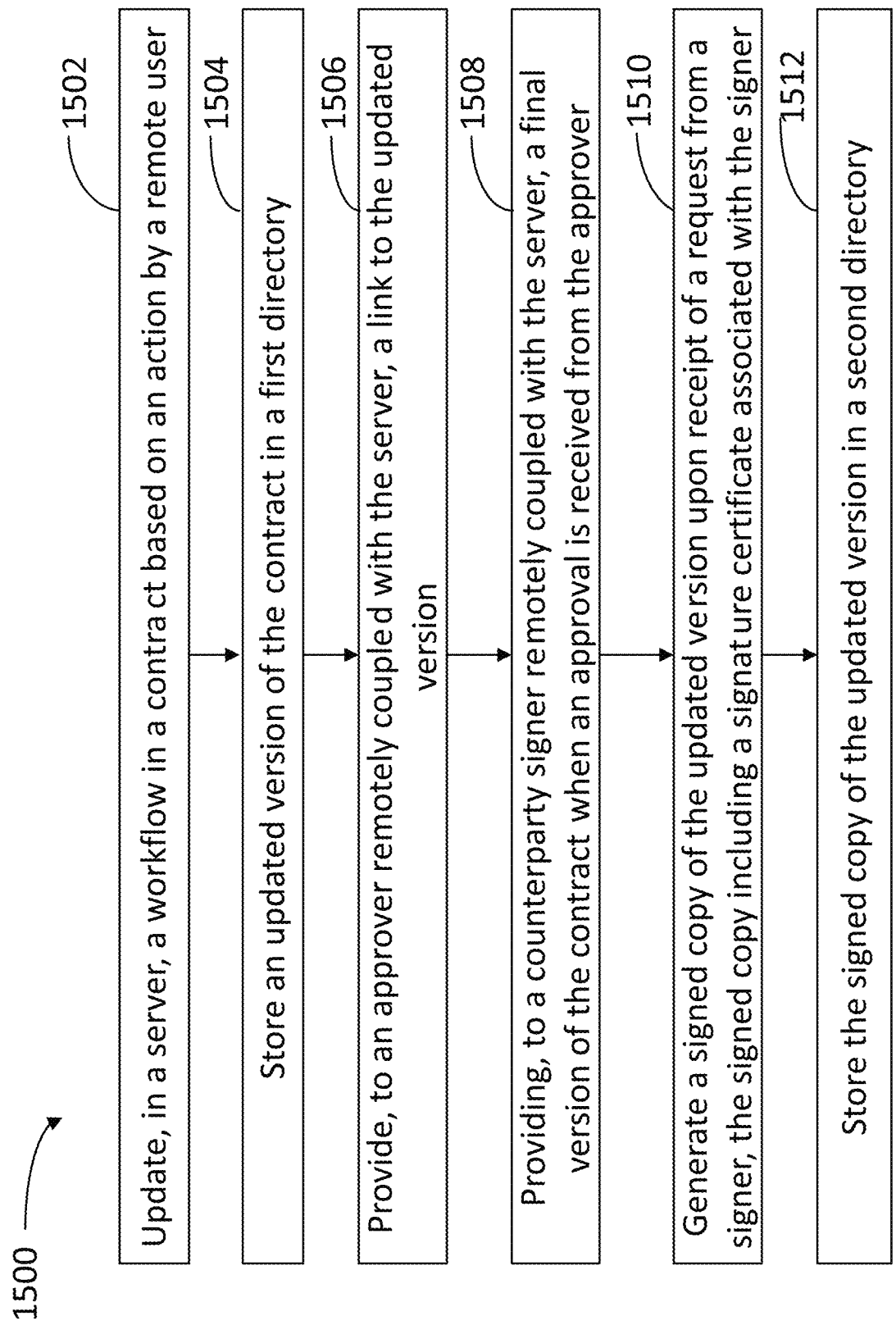
FIG. 15 is a flowchart illustrating steps in a method for managing workflows in a smart contract network, according to some embodiments.

FIG. 15 is a flowchart illustrating steps in a method 1500 for managing workflows in a smart contract network, according to some embodiments. Method 1500 may be performed at least partially by any one of the server and client device illustrated in FIGS. 1 and 2. For example, at least some of the steps in method 1500 may be performed by one component in a system including a client device running code for a browser and an application to access the server or the database (e.g., client device 210, server 230, contract engine 242, application 225, or browser 227). Accordingly, at least some of the steps in method 1500 may be performed by a processor executing commands from tools and algorithms stored in a memory of the server or of the client device, or accessible by the server or by the client device (e.g., processors 212, memories 220, networking tool 244, settings tool 245, editor tool 246, attributes tool 247, and algorithm 248). In some embodiments, the memory of the server may be a database in the server or a database remotely accessed by one or more servers and the client device (e.g., contract database 252). Further, in some embodiments, at least some of the steps in method 1500 may be performed overlapping in time, almost simultaneously, or in a different order from the order illustrated in method 1500. Moreover, a method consistent with some embodiments disclosed herein may include at least one, but not all, of the steps in method 1500.

Step 1502 includes updating, in a server, a workflow in a contract based on an action by a remote user. In some embodiments, step 1502 includes selecting a governing law controlling the signed copy of the updated version. In some embodiments, step 1502 includes adding a conditional variable to the contract, the conditional variable configured to acquire a value based on an input from the remote user, the signer, or the approver. In some embodiments, step 1502 includes adding or removing a portion of the contract based on a value of a conditional variable in the contract. In some embodiments, step 1502 includes modifying a role for at least one of the approver or the signer.

Step 1504 includes storing an updated version of the contract in a first directory. In some embodiments, step 1504 may include storing the updated version of the contract in the database.

Step 1506 includes providing, to an approver remotely coupled with the server, a link to the updated version. In some embodiments, step 1506 may include applying a conditional clause prior to providing the link of the updated version. In some embodiments, step 1506 may include verifying that a second approver has approved prior to providing the updated version to the approver. In some embodiments, step 1506 includes verifying a location associated to the updated version (e.g., a jurisdiction of the contract, and the like) prior to providing it to the approver.

Step 1508 includes providing, to a counterparty signer remotely coupled with the server, a final version of the contract when an approval is received from the approver.

Step 1510 includes generating a signed copy of the updated version upon receipt of a request from a signer, the signed copy including a signature certificate associated with the signer.

Step 1512 includes storing the signed copy of the updated version in a second directory. In some embodiments, step 1512 includes storing the signed copy of the updated version in the database. In some embodiments, step 1512 further includes using the updated version of the contract to create a new workflow for a new contract. In some embodiments, step 1512 further includes storing the updated version of the contract as a workflow template in one of the first directory or the second directory. In some embodiments, step 1512 further includes providing a dashboard to the remote user, the dashboard configured to list multiple workflows associated with multiple documents and to include a link to the first directory and to the second directory. In some embodiments, step 1512 further includes creating the workflow and selecting the approver and the signer associated with the workflow.

Figure 16:
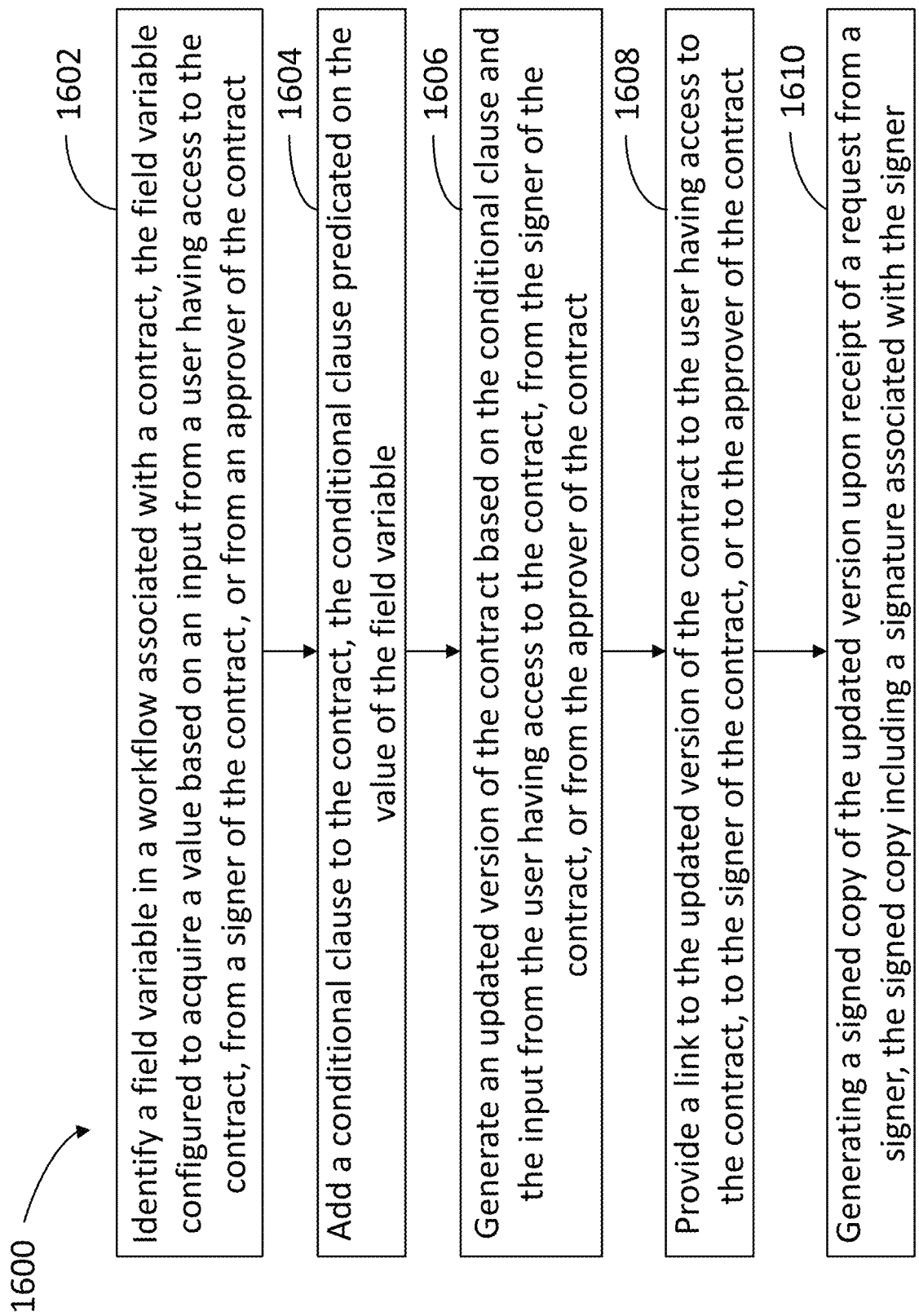
FIG. 16 is a flowchart illustrating steps in a method for managing workflows in a smart contract network, according to some embodiments.

FIG. 16 is a flowchart illustrating steps in a method 1600 for managing workflows in a smart contract network, according to some embodiments. Method 1600 may be performed at least partially by any one of the server and client device illustrated in FIGS. 1 and 2. For example, at least some of the steps in method 1600 may be performed by one component in a system including a client device running code for a browser and an application to access the server or the database (e.g., client device 210, server 230, contract engine 242, application 225, or browser 227). Accordingly, at least some of the steps in method 1600 may be performed by a processor executing commands from tools and algorithms stored in a memory of the server or of the client device, or accessible by the server or by the client device (e.g., processors 212, memories 220, networking tool 244, settings tool 245, editor tool 246, attributes tool 247, and algorithm 248). In some embodiments, the memory of the server may be a database in the server or a database remotely accessed by one or more servers and the client device (e.g., contract database 252). Further, in some embodiments, at least some of the steps in method 1600 may be performed overlapping in time, almost simultaneously, or in a different order from the order illustrated in method 1600. Moreover, a method consistent with some embodiments disclosed herein may include at least one, but not all, of the steps in method 1600.

Step 1602 includes identifying a field variable in a workflow associated with a contract, the field variable configured to acquire a value based on an input from a user having access to the contract, from a signer of the contract, or from an approver of the contract. In some embodiments, step 1602 includes creating a new field variable for the workflow.

Step 1604 includes adding a conditional clause to the contract, the conditional clause predicated on the value of the field variable. In some embodiments, step 1604 includes forming a Boolean combination including multiple values and ranges of the field variable.

Step 1606 includes generating an updated version of the contract based on the conditional clause and the input from the user having access to the contract, from the signer of the contract, or from the approver of the contract. In some embodiments, step 1606 includes adding or removing a portion of the contract based on a value of the conditional clause.

Step 1608 includes providing a link to the updated version of the contract to the user having access to the contract, to the signer of the contract, or to the approver of the contract. In some embodiments, step 1608 may include applying the conditional clause prior to providing the link of the updated version.

Step 1610 includes generating a signed copy of the updated version upon receipt of a request from a signer, the signed copy including a signature certificate associated with the signer.

Figure 17:
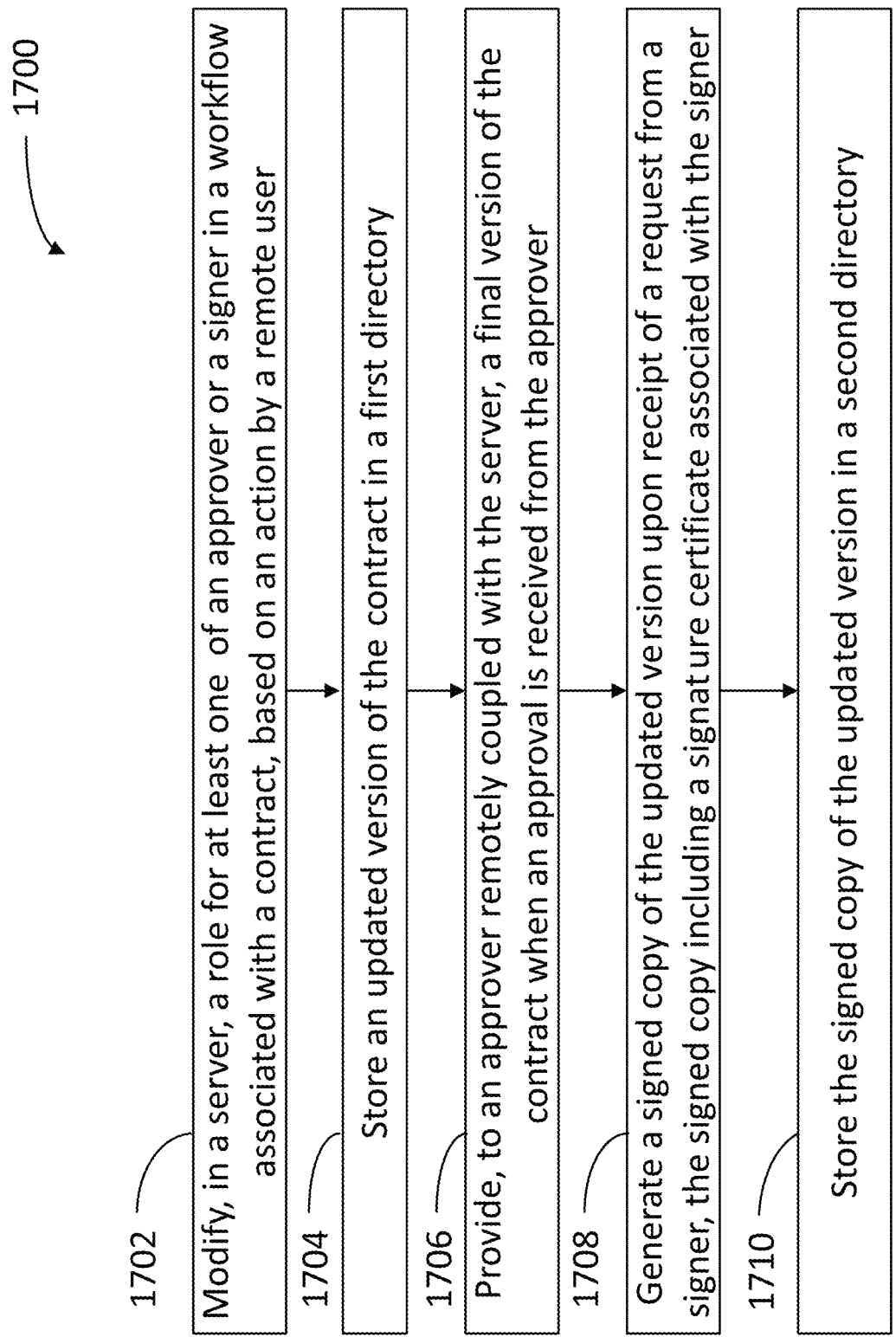
FIG. 17 is a flowchart illustrating steps in a method for managing workflows in a smart contract network, according to some embodiments.

FIG. 17 is a flowchart illustrating steps in a method 1700 for managing workflows in a smart contract network, according to some embodiments. Method 1700 may be performed at least partially by any one of the server and client device illustrated in FIGS. 1 and 2. For example, at least some of the steps in method 1700 may be performed by one component in a system including a client device running code for a browser and an application to access the server or the database (e.g., client device 210, server 230, contract engine 242, application 225, or browser 227). Accordingly, at least some of the steps in method 1700 may be performed by a processor executing commands from tools and algorithms stored in a memory of the server or of the client device, or accessible by the server or by the client device (e.g., processors 212, memories 220, networking tool 244, settings tool 245, editor tool 246, attributes tool 247, and algorithm 248). In some embodiments, the memory of the server may be a database in the server or a database remotely accessed by one or more servers and the client device (e.g., contract database 252). Further, in some embodiments, at least some of the steps in method 1700 may be performed overlapping in time, almost simultaneously, or in a different order from the order illustrated in method 1700. Moreover, a method consistent with some embodiments disclosed herein may include at least one, but not all, of the steps in method 1700.

Step 1702 includes modifying, in a server, a role for at least one of an approver or a signer in a workflow associated with a contract, based on an action by a remote user. In some embodiments, step 1702 includes adding at least one of a second approver or a second signer to the workflow. In some embodiments, step 1702 includes modifying a sequence of approvers for the contract, based on a value of a contract variable.

Step 1704 includes storing an updated version of the contract in a first directory.

Step 1706 includes providing, to an approver remotely coupled with the server, a link to a final version of the contract when an approval is received from the approver.

Step 1708 includes generating a signed copy of the updated version upon receipt of a request from a signer, the signed copy including a signature certificate associated with the signer.

Step 1710 includes storing the signed copy of the updated version in a second directory.

Figure 18:
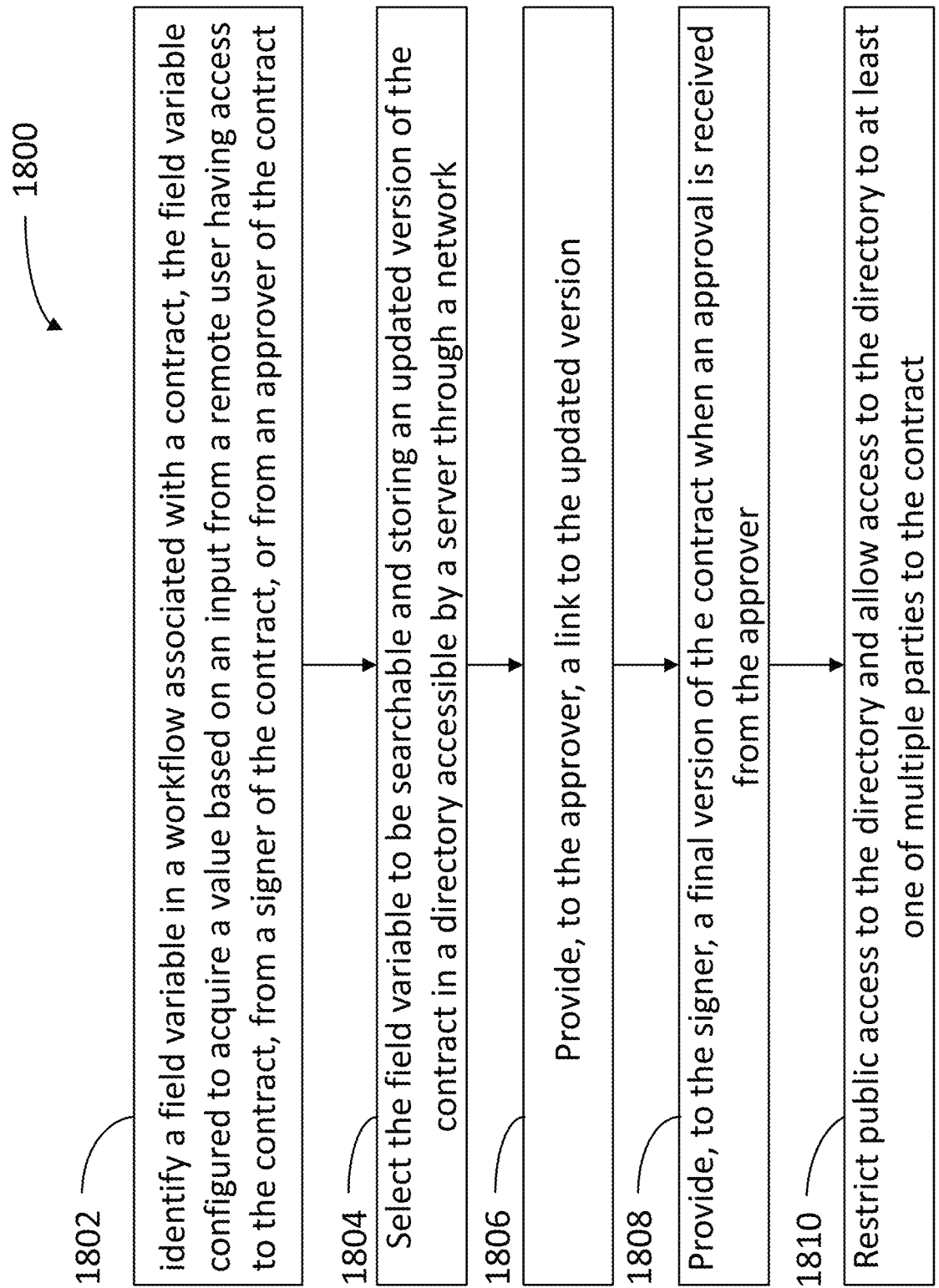
FIG. 18 is a flowchart illustrating steps in a method for managing workflows in a smart contract network, according to some embodiments.

FIG. 18 is a flowchart illustrating steps in a method 1800 for managing workflows in a smart contract network, according to some embodiments. Method 1800 may be performed at least partially by any one of the server and client device illustrated in FIGS. 1 and 2. For example, at least some of the steps in method 1800 may be performed by one component in a system including a client device running code for a browser and an application to access the server or the database (e.g., client device 210, server 230, contract engine 242, application 225, or browser 227). Accordingly, at least some of the steps in method 1800 may be performed by a processor executing commands from tools and algorithms stored in a memory of the server or of the client device, or accessible by the server or by the client device (e.g., processors 212, memories 220, networking tool 244, settings tool 245, editor tool 246, attributes tool 247, and algorithm 248). In some embodiments, the memory of the server may be a database in the server or a database remotely accessed by one or more servers and the client device (e.g., contract database 252). Further, in some embodiments, at least some of the steps in method 1800 may be performed overlapping in time, almost simultaneously, or in a different order from the order illustrated in method 1800. Moreover, a method consistent with some embodiments disclosed herein may include at least one, but not all, of the steps in method 1800.

Step 1802 includes identifying a field variable in a workflow associated with a contract, the field variable configured to acquire a value based on an input from a remote user having access to the contract, from a signer of the contract, or from an approver of the contract.

Step 1804 includes selecting the field variable to be searchable and storing an updated version of the contract in a directory accessible by a server through a network.

Step 1806 includes providing, to the approver, a link to the updated version.

Step 1808 includes providing, to the signer, a final version of the contract when an approval is received from the approver.

Step 1810 includes restricting public access to the directory and allowing access to the directory to at least one of multiple parties to the contract. In some embodiments, step 1810 includes searching, from the server, the directory for one or more instances of the field variable within multiple workflows stored in the directory.

Hardware Overview

Figure 19:
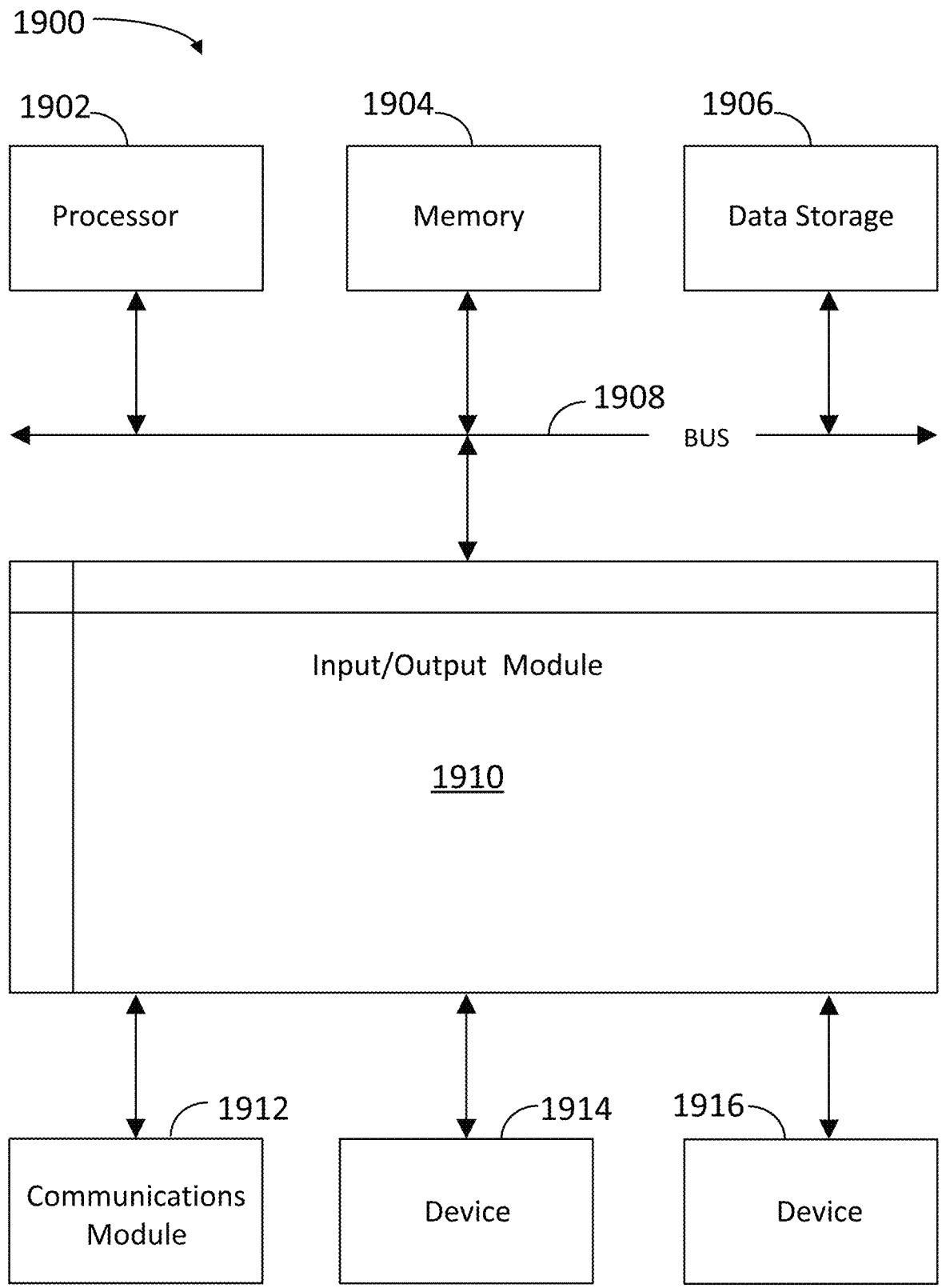
FIG. 19 is a block diagram illustrating an example computer system with which the client and server of FIGS. 1 and 2 and the methods of FIGS. 12-15 can be implemented.

FIG. 19 is a block diagram illustrating an exemplary computer system 1900 with which the client and server of FIGS. 1 and 2, and the methods of FIGS. 15-18 can be implemented. In certain aspects, the computer system 1900 may be implemented using hardware or a combination of software and hardware, either in a dedicated server, or integrated into another entity, or distributed across multiple entities.

Computer system 1900 (e.g., client 110 and server 130) includes a bus 1908 or other communication mechanism for communicating information, and a processor 1902 (e.g., processors 212) coupled with bus 1908 for processing information. By way of example, the computer system 1900 may be implemented with one or more processors 1902. Processor 1902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1900 can include, in addition to hardware, code that creates an execution environment for the computer program in question, e.g., code that constitutes processor firmware, a protocol stack, a database management system, an operating system, or a combination of one or more of them stored in an included memory 1904 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1908 for storing information and instructions to be executed by processor 1902. The processor 1902 and the memory 1904 can be supplemented by, or incorporated in, special purpose logic circuitry.

The instructions may be stored in the memory 1904 and implemented in one or more computer program products, e.g., one or more modules of computer program instructions encoded on a computer-readable medium for execution by, or to control the operation of, the computer system 1900, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1904 may also be used for storing temporary variable or other intermediate information during execution of instructions to be executed by processor 1902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1900 further includes a data storage device 1906 such as a magnetic disk or optical disk, coupled to bus 1908 for storing information and instructions. Computer system 1900 may be coupled via input/output module 1910 to various devices. Input/output module 1910 can be any input/output module. Exemplary input/output modules 1910 include data ports such as USB ports. The input/output module 1910 is configured to connect to a communications module 1912. Exemplary communications modules 1912 (e.g., communications modules 218) include networking interface cards, such as Ethernet cards and modems. In certain aspects, input/output module 1910 is configured to connect to a plurality of devices, such as an input device 1914 (e.g., input device 214) and/or an output device 1916 (e.g., output device 216). Exemplary input devices 1914 include a keyboard and a pointing device, e.g., a mouse or a trackball, by which a user can provide input to the computer system 1900. Other kinds of input devices 1914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1916 include display devices, such as an LCD (liquid crystal display) monitor, for displaying information to the user.

According to one aspect of the present disclosure, the client 110 and server 130 can be implemented using a computer system 1900 in response to processor 1902 executing one or more sequences of one or more instructions contained in memory 1904. Such instructions may be read into memory 1904 from another machine-readable medium, such as data storage device 1906. Execution of the sequences of instructions contained in main memory 1904 causes processor 1902 to perform the process steps described herein. One or more processors in a multi-processing arrangement may also be employed to execute the sequences of instructions contained in memory 1904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication tool (e.g., network 150) can include, for example, any one or more of a LAN, a WAN, the Internet, and the like. Further, the communication tool can include, but is not limited to, for example, any one or more of the following tool topologies, including a bus network, a star network, a ring network, a mesh network, a star-bus network, tree or hierarchical network, or the like. The communications modules can be, for example, modems or Ethernet cards.

Computer system 1900 can include clients and servers. A client and server are generally remote from each other and typically interact through a communication network. The relationship of client and server arises by virtue of computer programs running on the respective computers and having a client-server relationship to each other. Computer system 1900 can be, for example, and without limitation, a desktop computer, laptop computer, or tablet computer. Computer system 1900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1902 for execution. Such a medium may take many forms, including, but not limited to, non-volatile media, volatile media, and transmission media. Non-volatile media include, for example, optical or magnetic disks, such as data storage device 1906. Volatile media include dynamic memory, such as memory 1904. Transmission media include coaxial cables, copper wire, and fiber optics, including the wires forming bus 1908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

The subject technology is illustrated, for example, according to various aspects described below. Various examples of aspects of the subject technology are described as numbered claims (claim 1, 2, etc.) for convenience. These are provided as examples, and do not limit the subject technology.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, and/or one or more paragraphs.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
   training a machine learning algorithm for semantic and syntactical interpretation of a text and for correlating a text with a legal code to ensure that the text is consistent and complies with certain aspects of the legal code;
   causing, by a contract platform executing on a server, a first dashboard to be displayed on a first computing device, wherein the dashboard comprises a first tab, of a plurality of tabs, indicating a plurality of documents, each document having an associated workflow and status displayed via the first dashboard;
   in response to receiving a selection to begin a new workflow, generating, by the contract platform, a first document;
   receiving, via a second dashboard and from the first computing device, one or more inputs related to the first document, wherein a first input of the one or more inputs comprises identifying a field configured to acquire a value from one or more of a user having access to the first document, a signer of the first document, or an approver of the first document;
   adding, by the first computing device and via the second dashboard, a conditional clause to the first document, wherein the conditional clause is predicated on the value of the field;
   receiving a second input indicating the value of the field;
   based on receiving the second input, generating an updated version of the first document that includes the conditional clause and the value for the field;
   providing a link to the updated version of the first document to a second computing device associated with a signer of the first document and a third computing device associated with a countersigner of the first document;
   receiving a first signature from the signer of the document, wherein the first signature comprises a first certificate associated with the signer; and
   receiving a second signature from the countersigner of the first document, wherein the second signature comprises a second certificate associated with the countersigner;
   performing, using the machine learning algorithm, an error search on the first document; and
   generating, based on a determination that the first document does not contain any errors, a signed copy of the updated version of the first document.

2. The computer-implemented method of claim 1, wherein the identifying the field comprises creating a new field for the first document.

3. The computer-implemented method of claim 1, wherein the adding a conditional clause to the first document is based on a Boolean combination comprising multiple values and ranges of the field.

4. The computer-implemented method of claim 1, wherein generating an updated version of the first document further comprises removing a portion of the first document based on the value.

5. The computer-implemented method of claim 1, further comprising defining a plurality of pre-selected values for the field.

6. The computer-implemented method of claim 1, further comprising: causing, by the contract platform, the signed copy of the first document to be displayed via a second tab of the first dashboard.

7. The computer-implemented method of claim 1, wherein generating the first document further comprises receiving a selection of a draft template for the new workflow.

8. The computer-implemented method of claim 1, wherein third-party computing devices are restricted from accessing the signed copy of the first document.

9. A server comprising:
   one or more processors; and
   memory storing instructions that, when executed by the one or more processors, cause the server to:
   train a machine learning algorithm for semantic and syntactical interpretation of a text and for correlating a text with a legal code to ensure that the text is consistent and complies with certain aspects of the legal code;
   cause, by a contract platform executing on the server, a first dashboard to be displayed on a first computing device, wherein the dashboard comprises a first tab, of a plurality of tabs, indicating a plurality of documents, each document having an associated workflow and status displayed via the first dashboard;
   in response to receiving a selection to begin a new workflow, generate, by the contract platform, a first document;
   receive, via a second dashboard and from the first computing device, one or more inputs related to the first document, wherein a first input of the one or more inputs comprises identifying a field configured to acquire a value from one or more of a user having access to the first document, a signer of the first document, or an approver of the first document;
   add, by the first computing device and via the second dashboard, a conditional clause to the first document, wherein the conditional clause is predicated on the value of the field;
   receive a second input indicating the value of the field;
   based on receiving the second input, generate an updated version of the first document that includes the conditional clause and the value for the field;
   provide a link to the updated version of the first document to a second computing device associated with a signer of the first document and a third computing device associated with a countersigner of the first document;
   receive a first signature from the signer of the document, wherein the first signature comprises a first certificate associated with the signer; and
   receive a second signature from the countersigner of the first document, wherein the second signature comprises a second certificate associated with the countersigner;
   perform, using the machine learning algorithm, an error search on the first document; and
   generate, based on a determination that the first document does not contain any errors, a signed copy of the updated version of the first document.

10. The server of claim 9, wherein the instructions, when executed by the one or more processors, cause the server to identify the field by creating a new field for the first document.

11. The server of claim 9, wherein the instructions, when executed by the one or more processors, cause the server to add a conditional clause to the first document based on a Boolean combination comprising multiple values and ranges of the field.

12. The server of claim 9, wherein the instructions, when executed by the one or more processors, cause the server to generate an updated version of the first document by removing a portion of the first document based on the value.

13. The server of claim 9, wherein the instructions, when executed by the one or more processors, cause the server to define a plurality of pre-selected values for the field.

14. The server of claim 9, wherein the instructions, when executed by the one or more processors, cause the server to cause the signed copy of the first document to be displayed via a second tab of the first dashboard.

15. The server of claim 9, wherein the instructions, when executed by the one or more processors, cause the server to generate the first document in response to receiving a selection of a draft template for the new workflow.

16. The server of claim 9, wherein third-party computing devices are restricted from accessing the signed copy of the first document.

17. A non-transitory computer-readable medium storing instructions that, when executed, cause a server to:
- train a machine learning algorithm for semantic and syntactical interpretation of a text and for correlating a text with a legal code to ensure that the text is consistent and complies with certain aspects of the legal code;
- cause, by a contract platform executing on the server, a first dashboard to be displayed on a first computing device, wherein the dashboard comprises a first tab, of a plurality of tabs, indicating a plurality of documents, each document having an associated workflow and status displayed via the first dashboard;
- in response to receiving a selection to begin a new workflow, generate, by the contract platform, a first document;
- receive, via a second dashboard and from the first computing device, one or more inputs related to the first document, wherein a first input of the one or more inputs comprises identifying a field configured to acquire a value from one or more of a user having access to the first document, a signer of the first document, or an approver of the first document;
- add, by the first computing device and via the second dashboard, a conditional clause to the first document, wherein the conditional clause is predicated on the value of the field;
- receive a second input indicating the value of the field;
- based on receiving the second input, generate an updated version of the first document that includes the conditional clause and the value for the field;
- provide a link to the updated version of the first document to a second computing device associated with a signer of the first document and a third computing device associated with a countersigner of the first document;
- receive a first signature from the signer of the document, wherein the first signature comprises a first certificate associated with the signer; and
- receive a second signature from the countersigner of the first document, wherein the second signature comprises a second certificate associated with the countersigner;
- perform, using the machine learning algorithm, an error search on the first document; and
- generate, based on a determination that the first document does not contain any errors, a signed copy of the updated version of the first document.

18. The non-transitory computer-readable medium of claim 17, wherein the instructions, when executed, cause the server to identify the field by creating a new field for the first document.

19. The non-transitory computer-readable medium of claim 17, wherein the instructions, when executed, cause the server to add a conditional clause to the first document based on a Boolean combination comprising multiple values and ranges of the field.

20. The non-transitory computer-readable medium of claim 17, wherein the instructions, when executed, cause the server to generate an updated version of the first document by removing a portion of the first document based on the value.

21. The non-transitory computer-readable medium of claim 17, wherein the instructions, when executed, cause the server to define a plurality of pre-selected values for the field.

22. The non-transitory computer-readable medium of claim 17, wherein the instructions, when executed, cause the server to cause the signed copy of the first document to be displayed via a second tab of the first dashboard.

23. The non-transitory computer-readable medium of claim 17, wherein the instructions, when executed, cause the server to generate the first document in response to receiving a selection of a draft template for the new workflow.

24. The non-transitory computer-readable medium of claim 17, wherein third-party computing devices are restricted from accessing the signed copy of the first document.

* * * * *